United States Patent
Dudar

(10) Patent No.: US 9,938,913 B2
(45) Date of Patent: Apr. 10, 2018

(54) METHODS AND SYSTEMS FOR PURGING CONDENSATE FROM A CHARGE AIR COOLER

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 218 days.

(21) Appl. No.: 14/948,856

(22) Filed: Nov. 23, 2015

(65) Prior Publication Data

US 2017/0145933 A1 May 25, 2017

(51) Int. Cl.
*F02D 41/00* (2006.01)
*B60W 20/00* (2016.01)
(Continued)

(52) U.S. Cl.
CPC ............ *F02D 41/0007* (2013.01); *B60K 6/24* (2013.01); *B60W 20/00* (2013.01); *F02B 29/00* (2013.01);
(Continued)

(58) Field of Classification Search
CPC ............ F02D 41/0002; F02D 41/0005; F02D 41/007; F02D 41/0047; F02D 41/005; F02D 41/0052; F02D 41/0055; F02D 41/006; F02D 41/0062; F02D 41/0065; F02D 41/0072; F02D 41/0077; F02D 2041/001; F02D 2041/0017; F02D 2041/002; F02D 2041/0067; F02D 2041/007; F02D 2041/0075; F01P 1/00; F01P 3/22; F01P 5/00; F02B 29/04; F02B 29/0406; F02B 29/0412; F02B 29/0418; F02B 29/0425; F02B 29/0431; F02B 29/0456; F02B 29/0475; F02B 29/0481; B60K 11/00; B60K 11/06; B60K 11/08; B60K 6/20; B60K 6/22; B60K 6/24; B60W 2710/0638; B60W 20/00; Y10S 903/00; Y10S 903/902; Y10S 903/903; Y10S 903/904; Y10S 903/905; B60Y 2200/92

See application file for complete search history.

(56) References Cited

U.S. PATENT DOCUMENTS 6,237,357 B1 * 5/2001 Hirao ..................... B60H 1/004
                                                          62/239
7,011,080 B2 * 3/2006 Kennedy ............. F02B 29/0418
                                                          123/568.12

(Continued)

OTHER PUBLICATIONS

Martin, Douglas Raymond et al., "Fuel Vapor Line Diagnostics," U.S. Appl. No. 14/922,718, filed Oct. 26, 2015, 58 pages.

(Continued)

*Primary Examiner* — Tan Q Nguyen
*Assistant Examiner* — Sara J Lewandroski
(74) *Attorney, Agent, or Firm* — Julia Voutyras; McCoy Russell LLP

(57) ABSTRACT

Methods and systems are provided for purging condensate from a charge air cooler towards an intake air filter. In one example, a method may include operating a motor to rotate an engine in reverse and flowing air from the intake manifold to the atmosphere via the charge air cooler to purge condensate towards an intake air filter.

19 Claims, 8 Drawing Sheets

(51) Int. Cl.
  *B60K 6/24* (2007.10)
  *F02B 29/04* (2006.01)
  *F02B 29/00* (2006.01)
  *F02B 37/00* (2006.01)
  *F02M 26/02* (2016.01)

(52) U.S. Cl.
  CPC . *F02B 29/0406* (2013.01); *B60W 2710/0638* (2013.01); *B60Y 2200/92* (2013.01); *F02B 37/00* (2013.01); *F02D 2250/06* (2013.01); *F02D 2250/24* (2013.01); *F02M 26/02* (2016.02); *Y02T 10/146* (2013.01); *Y10S 903/905* (2013.01)

(56) References Cited

U.S. PATENT DOCUMENTS

| | | | | |
|---|---|---|---|---|
| 8,961,368 | B2* | 2/2015 | Glugla | B60W 20/15 477/110 |
| 2001/0040061 | A1* | 11/2001 | Matuda | B60H 1/00278 180/68.2 |
| 2011/0253111 | A1* | 10/2011 | Pursifull | F02B 21/02 123/559.1 |
| 2014/0060102 | A1* | 3/2014 | Nemesh | B60H 1/00278 62/238.7 |
| 2014/0102424 | A1* | 4/2014 | Norman | F02B 29/0468 123/542 |
| 2014/0109568 | A1* | 4/2014 | Glugla | F02D 41/10 60/599 |
| 2014/0109846 | A1* | 4/2014 | Styles | F01P 7/04 123/41.12 |
| 2014/0123963 | A1* | 5/2014 | Glugla | F02M 25/0227 123/542 |
| 2014/0157772 | A1* | 6/2014 | Glugla | F02B 29/04 60/599 |
| 2014/0251239 | A1* | 9/2014 | Richards | F02M 31/205 123/41.05 |
| 2014/0325959 | A1* | 11/2014 | McConville | F02B 29/0418 60/273 |
| 2015/0345371 | A1* | 12/2015 | Russ | F02B 37/04 123/542 |
| 2016/0047609 | A1* | 2/2016 | Gauthier | F01P 11/06 165/303 |
| 2016/0244052 | A1* | 8/2016 | Hirabayashi | B60K 6/445 |
| 2016/0305374 | A1* | 10/2016 | Jayakar | F02M 26/35 |
| 2017/0106740 | A1* | 4/2017 | Ingarra | B60K 11/08 |

OTHER PUBLICATIONS

Ossareh, Hamid-Reza et al., "Method and System for Engine Speed Control," U.S. Appl. No. 14/927,070, filed Oct. 29, 2015, 33 pages.

* cited by examiner

METHODS AND SYSTEMS FOR PURGING CONDENSATE FROM A CHARGE AIR COOLER

FIELD

The present description relates generally to methods and systems for controlling a vehicle engine of a hybrid electric vehicle system to purge condensate from a charge air cooler.

BACKGROUND/SUMMARY

Engines may increase output power by using boosting devices that compress intake air. Since charge compression increases air temperature, charge air coolers may be utilized downstream of a compressor to cool the compressed air, further increasing the potential power output of the engine. Ambient air from outside the vehicle is delivered across the charge air cooler to cool intake air passing through the inside of the charge air cooler. Condensate may form in the charge air cooler when the ambient air temperature decreases, or during humid or rainy weather conditions, where the intake air is cooled below the water dew point. Condensate may collect at the bottom of the charge air cooler, or in the internal passages, and cooling turbulators. When torque is increased, such as during acceleration, increased mass airflow may strip the condensate from the charge air cooler, drawing it into the engine and increasing the likelihood of engine misfire.

One example approach to prevent engine misfire due to condensate ingestion includes trapping and/or draining the condensate from the charge air cooler. While this may reduce condensate levels in the CAC, condensate is moved to an alternate location or reservoir, which may be subject to other condensate problems such as freezing and corrosion.

Another example approach for addressing moisture induced misfires is shown by Glugla et al. in US 20140109568. Therein, by increasing airflow through the charge air cooler, controlled amounts of condensate is blown off into the engine. However, the inventors herein have identified potential issues with such an approach. As one example, engine combustion stability may be sensitive to the amount of condensate. Consequently, even small errors in condensate metering can lead to misfires. Further, increasing airflow through the charge air cooler causes increased airflow to the engine. In order to compensate for increased torque due to the increased airflow, a vehicle controller may adjust one or more engine actuators (e.g., retard spark timing from MBT) to reduce torque. Such measures for torque compensation may degrade the engine efficiency.

In yet another example approach shown by Glugla in U.S. Pat. No. 8,961,368, misfires due to ingestion of condensate is addressed by purging condensate into the engine during a deceleration event when cylinder combustion is not occurring. This may increase deposition of condensate within the engine cylinders, which leads to rust formation and hence, cause structural damage to engine parts. Further, purging condensate into the engine when the cylinders are not combusting may cause the condensate to deposit within the catalytic converter in the exhaust passage. This may lead to degradation of the exhaust catalyst.

Taken together, even with controlled purging or purging when cylinders are not combusting, purging condensate from the charge air cooler into the engine may increase deposition of the condensate within the engine and the exhaust as the condensate travels through the engine and the exhaust parts. As a result, in addition to structural damage caused by condensate deposition, during purging or subsequent engine combustion after purging, misfires due to condensate ingestion are also increased. Further, due to increased airflow to the engine and the torque compensation approaches to counteract the excess torque from the increased airflow, engine efficiency is reduced.

In one example, some of the above issues may be addressed by a method for a boosted engine, comprising: responsive to a condensate level within a charge air cooler increasing above a threshold, reverse rotating the engine unfueled and flowing pressurized air from an intake manifold of the engine towards an intake air filter via the charge air cooler. In this way, condensate may be purged away from the engine, thereby reducing condensate deposition within the engine and the likelihood of misfires.

As an example, during selected vehicle operating conditions, such as during key OFF conditions or responsive to a key ON event, a vehicle controller may utilize an onboard DC motor to rotate the engine in a reverse direction unfueled to generate pressure inside the intake manifold. The pressurized air in the intake manifold is flown towards the intake air filter via the charge air cooler. As a result, condensate within the charge air cooler is purged away from the engine and towards the intake air filter. The purged condensate may then be delivered to the atmosphere via a conduit parallel to the intake air filter and including a check valve so that condensate does not deposit within the air filter, thus reducing the formation of molds within the air filter. In this way, by purging condensate from the charge air cooler towards the intake air filter, condensate deposition within the engine cylinders and the exhaust system is reduced. Consequently, misfires due to condensate ingestion are reduced. Further, structural damage to engine parts and the exhaust catalyst due to rust formation resulting from condensate deposition is reduced. Further still, by purging from the charge air cooler towards the intake air filter, a shorter path is provided for the condensate to travel from the charge air cooler to the atmosphere, thus further reducing the chances of condensate deposition within the engine system during purging. Further, by performing the purge operation during key OFF and when the engine is not utilized to propel the vehicle, torque compensation measures, such as spark retard that may be required when purging by increasing airflow through the engine, may not be utilized.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
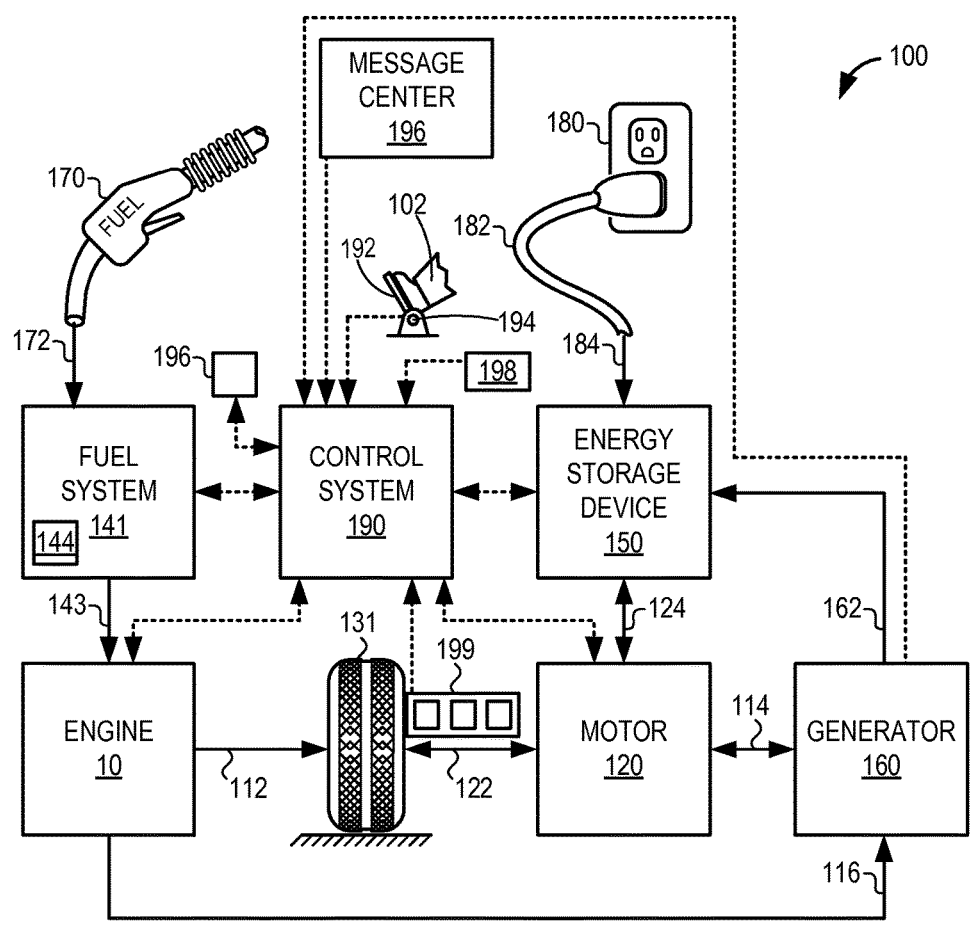
FIG. 1 shows an example hybrid vehicle propulsion system.
Figure 6:
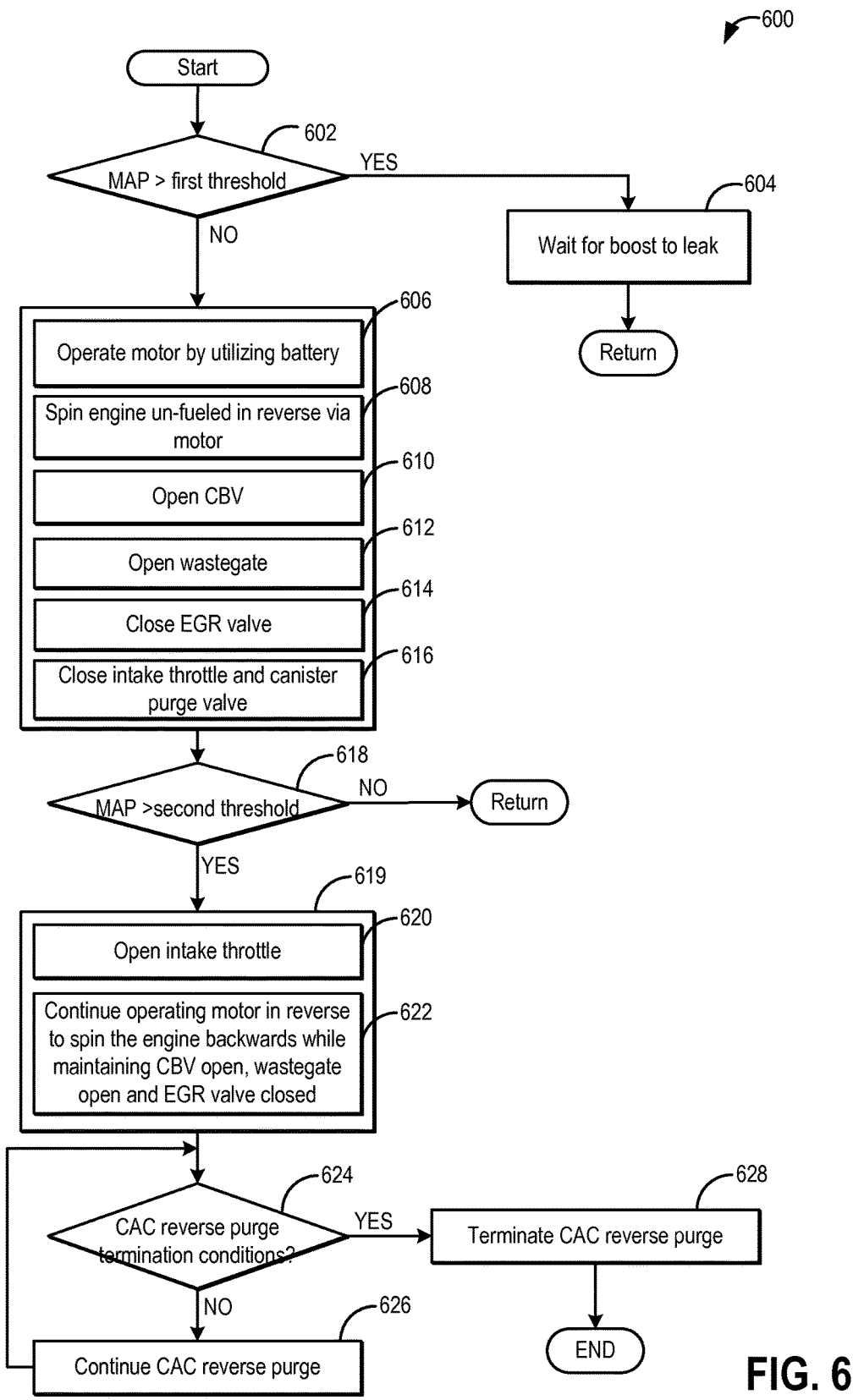
FIG. 6 shows a flowchart illustrating an example method for performing a reverse CAC purge operation to purge condensate from the CAC towards the intake air filter.
Figure 7:
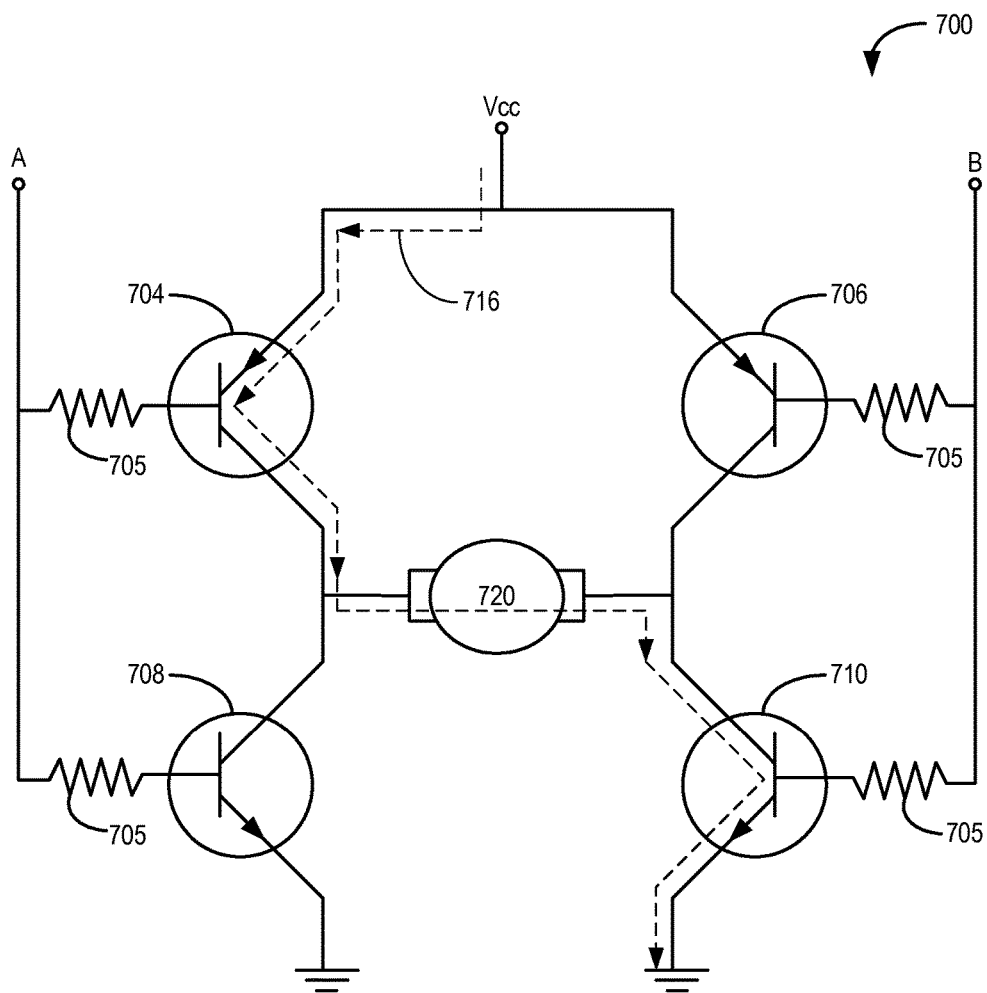
FIG. 7 is a schematic depiction of an example drive circuit utilized for operating a motor including changing a direction of rotation of the motor.
Figure 8:
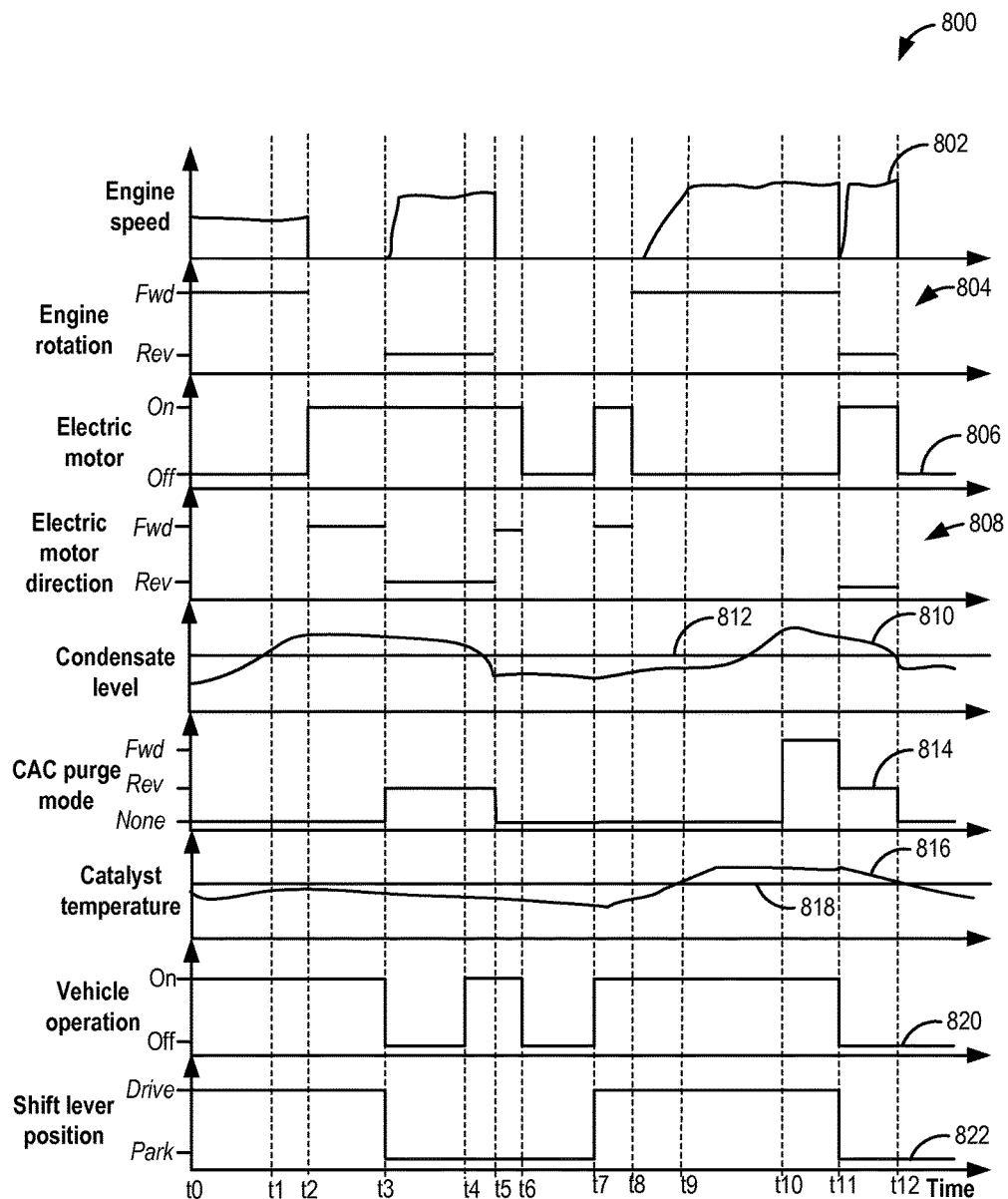
FIG. 8 is an example operating sequence for purging condensate from a CAC according to the present disclosure.

The following description relates to systems and methods for purging condensate from a charge air cooler included in a hybrid electric vehicle system, such as the vehicle propulsion system of FIG. 1. Specifically, an onboard electrical machine, such as a DC motor, may be utilized to reverse rotate an engine, such as the engine shown in FIG. 2, to flow air from an intake manifold of the engine towards an intake air filter via the charge air cooler to purge condensate away from the engine. An example of direction of airflow within the engine system during purging by reverse rotating the engine is shown in FIG. 3. In this way, by purging condensate from the charge air cooler towards the intake air filter, the technical effect of reduced condensate deposition within the engine during purging may be achieved. A controller, such as the controller of FIG. 1, may be configured to perform a control routine, such as the example routine of FIG. 4, for determining if a forward purge operation (where the condensate is purged towards the engine) or a reverse purge operation (where the condensate is purged away from the engine and towards the intake air filter) may be performed based on vehicle operating conditions. Further, the controller may be configured to perform the example routine of FIG. 5 for determining if the reverse purge operation may be performed during vehicle OFF conditions. An example routine for performing the reverse purge operation is shown in FIG. 6. Further, an example driver circuit to adjust an operation of the motor utilized to reverse rotate the engine is shown at FIG. 7. In some examples, the controller may switch between performing a forward purge operation and a reverse purge operation based on one or more vehicle operating conditions. Accordingly, an example operating sequence illustrating purging of the CAC according to an embodiment of the present disclosure is shown at FIG. 8.

FIG. 1 illustrates an example vehicle propulsion system 100. Vehicle propulsion system 100 includes a fuel-burning engine 10 and a motor 120. As a non-limiting example, engine 10 comprises an internal combustion engine and motor 120 comprises an electric motor. Motor 120 may be configured to utilize or consume a different energy source than engine 10. For example, engine 10 may consume a liquid fuel (e.g., gasoline) to produce an engine output while motor 120 may consume electrical energy to produce a motor output. As such, a vehicle with propulsion system 100 may be referred to as a hybrid electric vehicle (HEV) or simply a hybrid vehicle. Alternatively, the propulsion system 100 depicted herein may be termed a plug-in hybrid electric vehicle (PHEV).

Vehicle propulsion system 100 may be operated in a variety of different operational modes depending on operating conditions encountered by the vehicle propulsion system. Some of these modes may enable engine 10 to be maintained in an off state (e.g., set to a deactivated state) where combustion of fuel at the engine is discontinued. For example, under select operating conditions, motor 120 may propel the vehicle via drive wheel 131 as indicated by arrow 122 while engine 10 is deactivated (herein also referred to as an electric mode). Herein, the engine may be shut down to rest while the motor propels vehicle motion.

During other operating conditions, engine 10 may be set to a deactivated state (as described above) while motor 120 may be operated to charge energy storage device 150. For example, motor 120 may receive wheel torque from drive wheel 131 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator operation in some embodiments. However, in other embodiments, generator 160 may instead receive wheel torque from drive wheel 131, where the generator may convert the kinetic energy of the vehicle to electrical energy for storage at energy storage device 150 as indicated by arrow 162.

During still other operating conditions, engine 10 may be operated by combusting fuel received from fuel system 141 as indicated by arrow 143. For example, engine 10 may be operated to propel the vehicle via drive wheel 131 as indicated by arrow 112 while motor 120 is deactivated (herein also referred to as an engine mode). During other operating conditions, both engine 10 and motor 120 may each be operated to propel the vehicle via drive wheel 131 as indicated by arrows 112 and 122, respectively (herein also referred to as an assist mode). A configuration where both the engine and the motor may selectively propel the vehicle may be referred to as a parallel type vehicle propulsion system. Note that in some embodiments, motor 120 may propel the vehicle via a first set of drive wheels and engine 10 may propel the vehicle via a second set of drive wheels.

In other embodiments, vehicle propulsion system 100 may be configured as a series type vehicle propulsion system, whereby the engine does not directly propel the drive wheels. Rather, engine 10 may be operated to power motor 120, which may in turn propel the vehicle via drive wheel 131 as indicated by arrow 122. For example, during select operating conditions, engine 10 may drive generator 160, which may in turn supply electrical energy to one or more of motor 120 as indicated by arrow 114 or energy storage device 150 as indicated by arrow 162. As another example, engine 10 may be operated to drive motor 120, which may in turn provide a generator operation to convert the engine output to electrical energy, where the electrical energy may be stored at energy storage device 150 for later use by the motor. For example, during a reverse purge operation of a charge air cooler included within an intake passage of engine 10, the motor may use electrical energy stored at energy storage device 150 to rotate the engine in reverse.

Fuel system 141 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 10 as indicated by arrow 143. Thus, liquid fuel may be supplied from fuel tank 144 to engine 10 of the motor vehicle shown in FIG. 1. Still other suitable fuels or fuel blends may be supplied to engine 10, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

The vehicle propulsion system 100 may also include an ambient temperature/humidity sensor 198 and a roll stability control sensor, such as a lateral and/or longitudinal and/or yaw rate sensor(s) 199. Control system 190 may communicate with one or more of engine 10, motor 120, fuel system 141, energy storage device 150, and generator 160. Control system 190 may receive sensory feedback information from one or more of engine 10, motor 120, fuel system 141, energy storage device 150, and generator 160. Further, control system 190 may send control signals to one or more of engine 10, motor 120, fuel system 141, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194, which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 10.

Fuel system 141 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 10 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

Fuel in fuel tanks of hybrid vehicles may not be used for combustion for substantially long durations (e.g., months) if the hybrid vehicle is operated in an electric mode (e.g., engine-off mode). The hybrid vehicle may be operated in the electric mode for months if the vehicle operator decides to recharge the energy storage device regularly and constantly and if the vehicle is driven largely on surface streets without activating the engine.

Figure 2:
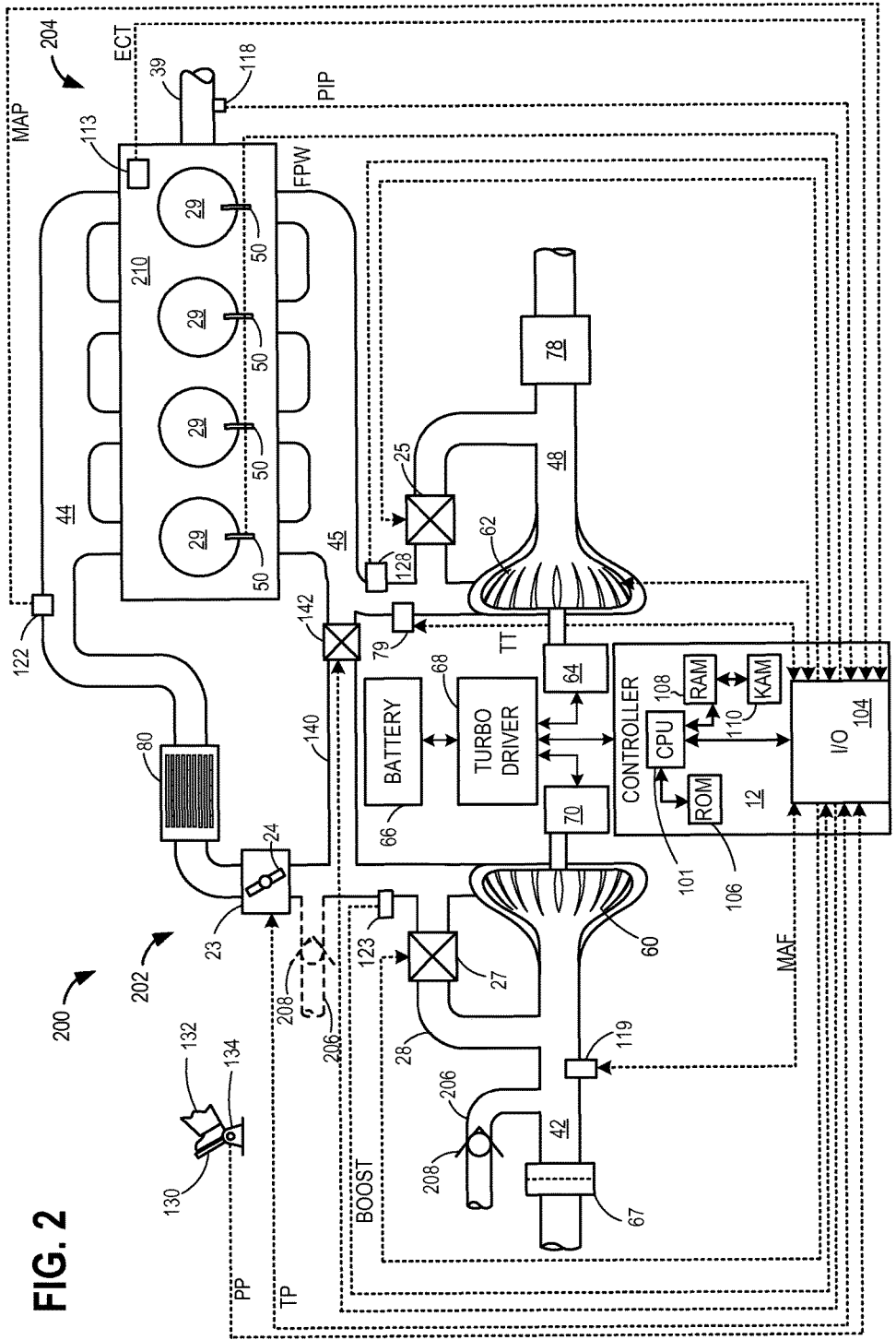
FIG. 2 is a schematic diagram showing aspects of the engine of FIG. 1.
Figure 3:
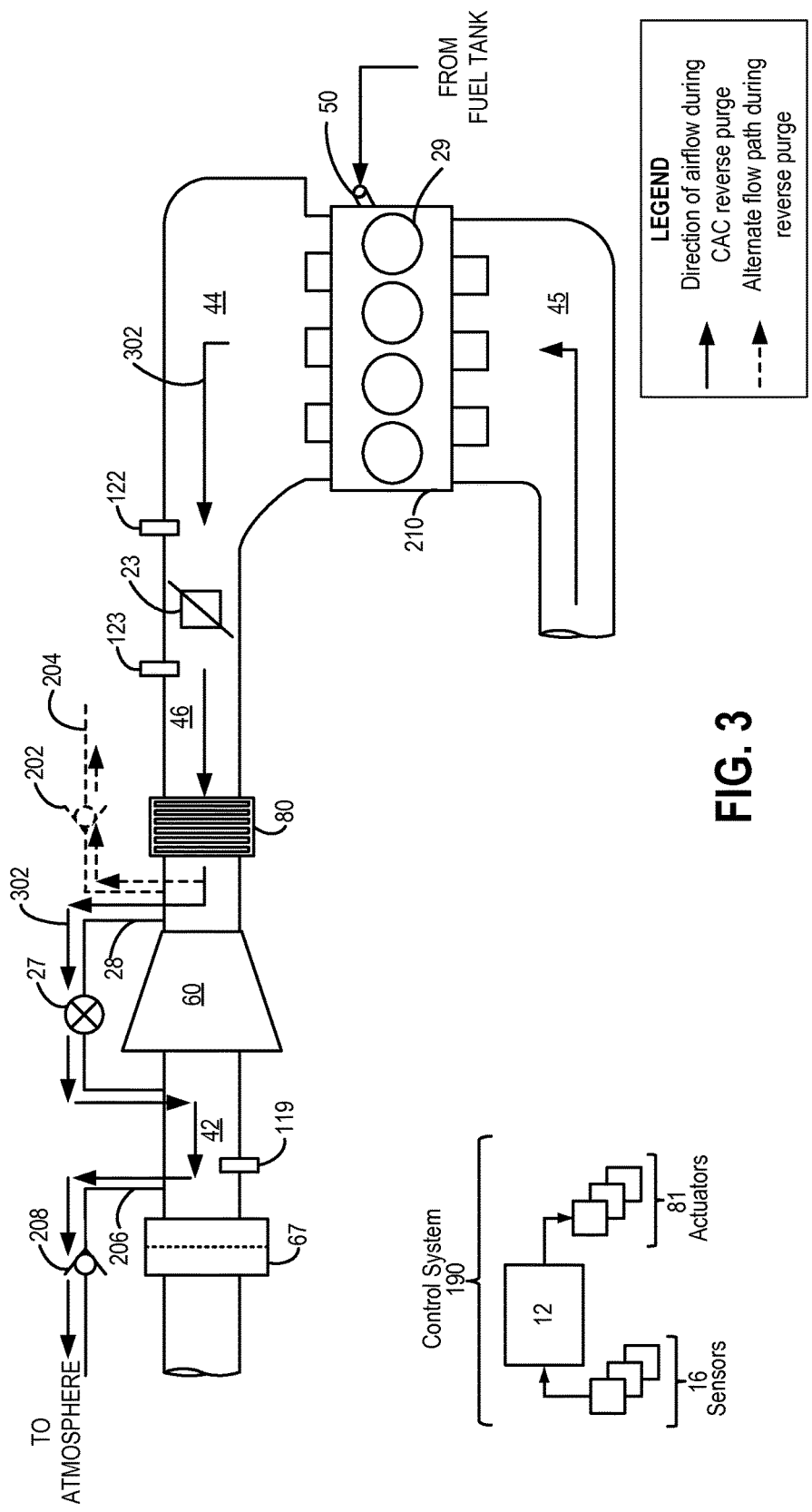
FIG. 3 shows a schematic depiction of the engine of FIG. 1 including airflow during purging condensate from a charge air cooler (CAC) according to the present disclosure.

FIG. 2 shows a schematic depiction of an engine system 200. In some examples, engine system 200 may be an engine system included in a hybrid vehicle system, such as the vehicle propulsion system 100 of FIG. 1. The engine system 200 may include an engine 210 having a plurality of cylinders 29. As such, engine 210 may be the same as engine 110 of FIG. 1. The engine 210 includes an engine intake 202 and an engine exhaust 204. The engine intake 202 includes a throttle 23 fluidly coupled to the intake manifold 44. Fresh intake air enters intake passage 42 and flows through air filter 67. Air filter 67 positioned in the intake passage 42 may clean intake air before the intake air is directed to the intake manifold 44. Cleaned intake air exiting the air filter 67 may stream past throttle 23 (also termed intake throttle 23) into intake manifold 44 via intake passage 42. As such, intake throttle 23, when fully opened, may enable a higher level of fluidic communication between intake manifold 44 and intake passage 42 downstream of air filter 67. An amount of intake air provided to the intake manifold 244 may be regulated via throttle 23 based on engine operating conditions. The engine exhaust 204 includes an exhaust manifold 45 leading to an exhaust passage 48 that routes exhaust gas to the atmosphere. The engine exhaust 204 may include one or more emission control devices 78, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Engine 210 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48 and communicate with exhaust gasses flowing there through. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 25 for diverting exhaust gas away from turbine 62. In some embodiments, wastegate 25 may be a multi-staged wastegate, such as a two-staged wastegate with a first stage configured to control boost pressure and a second stage configured to increase heat flux to emission control device 78. Wastegate 25 may be operated with an actuator, which may be an electric actuator such as an electric motor, for example, though pneumatic actuators are also contemplated. Further, a compressor bypass valve 27 configured to divert intake air around compressor 60 may be included within a compressor bypass passage coupled across compressor 60. Wastegate 25 and/or compressor bypass valve 27 may be controlled by controller 12 via actuators to be opened when a lower boost pressure is desired, for example.

Intake passage 42 may further include charge air cooler (CAC) 80 (e.g., an intercooler) to decrease the temperature of the turbocharged or supercharged intake gases. In some embodiments, CAC 80 may be an air-to-air heat exchanger. In other embodiments, CAC 80 may be an air to liquid heat exchanger. Hot charge air from the compressor 60 enters the CAC 80, cools as it travels through CAC 80 into the engine intake manifold 46. In the given example, intake throttle is positioned upstream (with respect to direction of airflow from the atmosphere to the engine 210 via the compressor and the CAC) of CAC 80 and downstream of compressor 60. However, in some other examples, as shown in FIG. 3, intake throttle 23 may be positioned downstream (with respect to direction of airflow from the atmosphere to the engine) of the CAC 80. Ambient airflow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. To reduce the accumulation of condensate and risk of corrosion, condensate may be collected at the bottom of the CAC, and then be purged. Specifically, during certain vehicle operating conditions, condensate may be purged towards the engine, in a process herein referred to as forward CAC purge operation or forward purge operation. However, if the condensate is introduced the engine, there may be an increase in the chance of engine misfire or combustion instability (in the form of late/slow burns) due to the ingestion of water. Thus, as elaborated herein with reference to FIGS. 4-8, the condensate from the CAC may be purged towards the intake air filter. This process of purging condensate from the CAC towards the intake air filter will be referred to herein as reverse CAC purge operation or reverse purge operation. Purging the condensate away from the engine may help to reduce the likelihood of engine misfire events. Further, by purging the condensate towards the intake air filter, condensate travels through fewer engine parts, which reduces the deposition of the condensate within the engine system during purging.

Engine 210 is shown with four cylinders 29. However, other numbers of cylinders may be used in accordance with the current disclosure. Engine 210 may be controlled at least partially by a control system including controller 12, and by input from a vehicle operator 132 via an input device 130. The control system including controller 12 may be the same as control system 190 shown in FIG. 1. In this example, input device 130 includes an accelerator pedal and a pedal position sensor 134 for generating a proportional pedal position signal PP. As such, input device 130 may be the same as input device 192 at FIG. 1, vehicle operator 132 may be the same as vehicle operator 102 at FIG. 1, and pedal position sensor 134 may be the same as pedal position sensor 194 at FIG. 1. Each combustion chamber (e.g., cylinder) 29 of engine 210 may include combustion chamber walls with a piston (not shown) positioned therein. The pistons may be coupled to a crankshaft 39 so that reciprocating motion of the piston is translated into rotational motion of the crankshaft. Crankshaft 39 may be coupled to at least one drive wheel of a vehicle via transmission 30, for example. Further, a starter motor may be coupled to crankshaft 39 via a flywheel to enable a starting operation of engine 10.

During forward rotation of engine 210, combustion chambers 29 may receive intake air from intake manifold 44 via intake passage 42 and one or more intake valves (not shown) and may exhaust combustion gasses via one or more exhaust valves (not shown) and exhaust passage 48. Intake manifold 44 and exhaust manifold 45 can selectively communicate with combustion chamber 29 via the respective intake valves and exhaust valves (not shown). In some embodiments, combustion chamber 29 may include two or more intake valves and/or two or more exhaust valves. However, during some conditions, engine 210 may be rotated in a reverse direction by utilizing a motor, such as motor 120 at FIG. 1. During reverse rotation of engine 210, combustion chambers may receive air via exhaust passage 48 and exhaust valves, and deliver pressurized air to intake passage 42 via intake valves and intake manifold 44. In other words, during reverse rotation, the direction of flow of gases within engine system 200 is reverse. Engine 210 may be rotated in reverse to increase positive pressure in the intake manifold, which may be utilized to purge condensate accumulated within CAC 80 located within intake passage 42. For example, in response to a condensate level reaching a threshold or increasing above the threshold, during some vehicle operating conditions, engine 210 may be rotated in reverse via a motor to flow pressurized air from the engine cylinders towards the intake air filter and then to the atmosphere via CAC 80. By flowing air from the engine cylinders to the atmosphere via CAC 80, condensate within the CAC may be delivered to the atmosphere without traversing the engine cylinders. While reverse rotating the engine to purge condensate from the CAC, the engine may be operated without fuel injection but with the exhaust valves operating to deliver air from the exhaust manifold to the cylinders and the intake valves functioning to deliver compressed air from the cylinders to the intake manifold. Direction of airflow within the engine system during the reverse purge operation is shown at FIG. 3.

A conduit 206 is coupled to intake passage 42 downstream (with respect to airflow from the atmosphere towards the engine cylinders) of air filter 67 and upstream of compressor 60. During reverse purge operation, the condensate along with air may be purged to the atmosphere via conduit 206. By purging via conduit 206, condensate may be delivered to the atmosphere without travelling through the air filter. Further, a check valve 208 may be included within the conduit 206 to prevent flow of air from the atmosphere into the intake passage 42 via the conduit during engine operation. In some examples, alternatively, conduit 206 (indicated by broken lines) including check valve 208 may couple a portion of the intake passage 42 downstream (with respect to airflow from the atmosphere towards the engine cylinders) of compressor 60 and upstream of CAC 80 and intake throttle 23 to the atmosphere.

The reverse CAC purge operation may be performed in response to the condensate level increasing above the threshold and when reverse purge operation conditions are met. For example, reverse purge operation conditions may include a state of charge (SOC) of an energy storage device, such energy storage device 150 at FIG. 1, is above a threshold level. The threshold level may be based on an amount of condensate within the CAC. For example, as the amount of condensate increases, the threshold level of charge to perform a reverse purge operation may be higher as the motor may be utilized to reverse rotate the engine for a longer duration to purge the condensate. Further, reverse purge operation may be performed when the vehicle is stopped and the engine is not utilized to propel the vehicle. Thus, reverse purge operation may be performed responsive to a key OFF event. Additionally or alternatively, reverse purge operation may be performed at key ON while the vehicle is operating (that is, vehicle ON condition) with the gear lever in park mode. Further, in some examples, reverse purge operation may be performed when the vehicle is operating with the gear lever in drive mode and the vehicle is stopped and the engine is not operated to propel the vehicle (e.g., when the vehicle is stopped at a stop sign or traffic light). Further details of vehicle operating conditions when a reverse purge operation may be performed will be further described with respect to FIGS. 4 and 5; and details of the reverse purge operation will the elaborated with respect to FIG. 6.

Further, engine is reverse rotated by operating the motor (e.g., motor 120 at FIG. 1). For example, path of current flow through a drive circuit, such as circuit 700 at FIG. 7, electrically coupled to the motor may be adjusted to adjust a direction of rotation of the motor for reverse rotation of the engine. Details of operating the motor for reverse rotation of the engine will be further described with respect to FIG. 7.

Fuel injectors 50 are shown coupled directly to combustion chamber 29 for injecting fuel directly therein in proportion to the pulse width of signal FPW received from controller 12. In this manner, fuel injector 50 provides what is known as direct injection of fuel into combustion chamber 29. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 29 may alternatively, or additionally, include a fuel injector arranged in intake manifold 44 in a configuration that provides what is known as port injection of fuel into the intake port upstream from each combustion chamber 29.

Intake passage 42 may include throttle 23 having throttle plate 24. In this particular example, the position of throttle plate 24 may be varied by controller 12 via signals provided to an actuator included with throttle 23. In one example, the actuator may be an electric actuator (e.g., electric motors), a configuration that is commonly referred to as electronic throttle control (ETC). In this manner, throttle 23 may be operated to vary the intake air provided to combustion chamber 29 among other engine cylinders. The position of throttle plate 24 may be provided to controller 12 by throttle position signal TP. Intake passage 42 may further include a mass air flow sensor 119, a manifold air pressure sensor 122, and a throttle inlet pressure sensor 123 for providing respective signals MAF (mass airflow) MAP (manifold air pressure) to controller 12.

In one example, as described below, responsive to the condensate level increasing above the threshold, condensate from the CAC may be purged towards the engine cylinders and exhaust (forward CAC purge operation). During a forward CAC purge operation, engine 210 may be rotated in the forward direction and air flow to engine 210 may be increased (greater than requested by the vehicle operator) by increasing an opening of throttle 23. By increasing airflow to the engine, condensate from the CAC may be purged towards the engine cylinders and exhaust from the CAC. Details of vehicle operating conditions during which a forward purge operation may be performed, and details of the forward purge operation will the elaborated with respect to FIG. 4 below.

Exhaust passage 48 may receive exhaust gasses from cylinders 29. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three-way catalyst (TWC), NOx trap, various other emission control devices, or combinations thereof. While not shown in FIG. 2, it will be appreciated that a similarly configured intake air sensor may be included in engine 10 (e.g., coupled to intake passage 42) to enable sensing of intake gas AFR. As with exhaust gas sensor 128, the intake air sensor may be any suitable sensor for providing an indication of intake gas AFR such as a linear oxygen sensor or UEGO, a two-state oxygen sensor or EGO, a HEGO, a $NO_x$, HC, or CO sensor, for example.

A temperature of emission control device (herein also referred to as exhaust catalyst temperature) may be determined based on output from an exhaust catalyst temperature sensor (not shown) located within the emission control device 78. As further described below, during conditions when the exhaust catalyst temperature is below a threshold temperature, responsive to the condensate level increasing above the threshold, a reverse purge operation may be performed (if other reverse purge operation conditions are met). When the exhaust catalyst temperature is below the threshold, if a forward purge operation is performed, sufficient thermal energy may not be available to vaporize the condensate traveling through the emission control device. As a result, the condensate may deposit within the catalyst, which may cause catalyst degradation. By performing a reverse purge operation (instead of a forward purge operation) when the exhaust catalyst temperature is below the threshold, condensate from the CAC may be expelled to the atmosphere without travelling through the emission control device, thereby preventing catalyst degradation.

Exhaust temperature may be measured by one or more temperature sensors (not shown) located in exhaust passage 48. Alternatively, exhaust temperature may be inferred based on engine operating conditions such as speed, load, AFR, spark retard, etc.

Controller 12 is shown in FIG. 2 as a microcomputer, including microprocessor unit 101, input/output ports 104, an electronic storage medium for executable programs and calibration values shown as read only memory chip 106 in this particular example, random access memory 108, keep alive memory 10, and a data bus. Controller 12 may receive various signals from sensors coupled to engine 210, in addition to those signals previously discussed, including measurement of inducted mass air flow (MAF) from mass air flow sensor 119; engine coolant temperature (ECT) from temperature sensor 113; a profile ignition pickup signal (PIP) from Hall effect sensor 118 (or other type) coupled to crankshaft 39; the throttle position (TP) from a throttle position sensor; absolute manifold pressure signal, MAP, from sensor 122; exhaust catalyst temperature from an exhaust catalyst temperature sensor; and an indication of a battery state of charge from the energy storage device. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 39. In some examples, storage medium read-only memory 106 may be programmed with computer readable data representing instructions executable by processor 101 for performing the methods described below as well as other variants that are anticipated but not specifically listed. The controller 12 receives signals from the various sensors of FIG. 1 and FIG. 2 and employs the various actuators of FIG. 1 and FIG. 2 to adjust engine operation based on the received signals and instructions stored on a memory of the controller.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 2 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Turning to FIG. 3, a schematic depiction of an embodiment of engine system 200 including direction of airflow during a reverse CAC purge operation is shown is shown. Many of the elements of FIG. 3 correspond to similarly numbered elements already described above for FIG. 2; such elements will not be described again for the sake of brevity. In the embodiment shown in FIG. 3, CAC 80 is positioned in between compressor 60 and intake throttle 23. In other embodiments, CAC 80 may be positioned downstream (with respect to direction of flow from the atmosphere towards engine 210) of throttle 23.

Reverse CAC purge operation may be performed to purge condensate from CAC 80 towards CAC by rotating engine 210 un-fueled in reverse via operating a motor, such as motor 120 at FIG. 1, in reverse. During the reverse purge operation, air may enter engine cylinders 29 via exhaust manifold 45 and the exhaust valves (not shown), and compressed air from the cylinders may flow to the intake manifold 44 via the intake valves (not shown). Direction of flow of air during a reverse purge operation is shown by solid arrows 302. As indicated, air is flown from the intake manifold 44 to the intake passage 42 via intake throttle 23. In the intake passage, air flows via the CAC, and then flows into the compressor bypass passage 28 from upstream (with respect to flow of air from the atmosphere to the engine) of the CAC. Air then flows into the intake passage 42 from the compressor bypass passage before flowing into the conduit 206 and exiting into the atmosphere. In another example, when the conduit 206 is positioned in between compressor 60 and CAC 80 (alternate positioning of conduit 206 is indicated in broken lines), air may be delivered from upstream of the compressor to the atmosphere via conduit 206 without flowing through the compressor or the compressor bypass passage. This provides a shorter path for the condensate to exit from the engine system.

Controller 12 may be included in control system 190. Control system 190 is shown receiving information from a plurality of sensors 16 (various examples of which are described herein) and sending control signals to a plurality of actuators 81 (various examples of which are described herein). The controller 12 receives signals from the various sensors of FIGS. 1-3 and employs the various actuators of FIG. 1-3 to adjust engine operation based on the received signals. As one example, based on signals from one or more sensors, controller 12 may execute a routine to determine if conditions for performing a reverse purge operation are satisfied. Upon the reverse purge conditions being met, the controller may adjust one or more actuators to rotate the engine in reverse, increase positive pressure in the intake manifold, and flow air from the intake manifold towards the atmosphere via the CAC to purge the condensate within the CAC.

Figure 4:
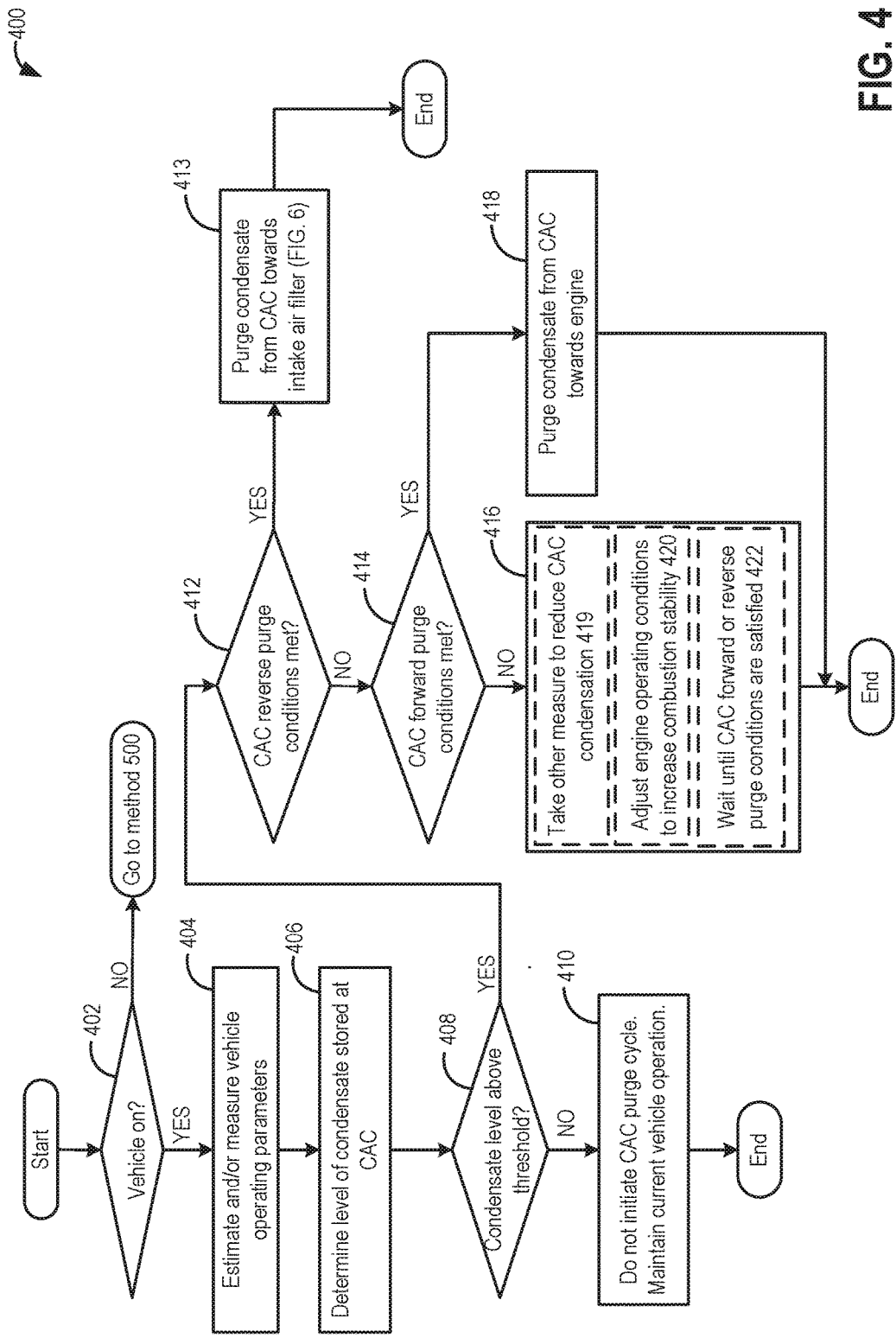
FIG. 4 shows a flow chart illustrating an example method for determining a type of purge operation for purging condensate from a CAC during vehicle ON conditions.

Turning to FIG. 4, an example method 400 for initiating a purging operation during vehicle ON conditions to purge condensate from a charge air cooler (CAC), such as CAC 80 at FIG. 2, is shown. Specifically, method 400 includes determining if a reverse purge operation for purging condensate from the CAC towards an intake air filter, such as air filter 67 at FIGS. 2 and 3, or a forward purge operation for purging the condensate from the CAC towards the engine may be performed based on one or more vehicle operating conditions. Instructions for carrying out method 400 and the rest of the methods included herein may be executed by a controller, such as controller 12 at FIG. 2, based on instructions stored on a memory of the controller and in conjunction with signals received from sensors of the engine system, such as the sensors described above with reference to FIGS. 1-3. The controller may employ engine actuators of the engine system to adjust engine operation, according to the methods described below.

Method 400 begins at 402. At 402, method 400 includes confirming if the vehicle is ON. Upon confirming that the vehicle is ON, method 400 proceeds to 404. If the vehicle is not operating, method 400 proceeds to method 500 described at FIG. 5.

At 404, method 400 includes estimating and/or measure vehicle operating conditions. Vehicle operating conditions may include operating conditions of an engine, such as engine 10 at FIG. 1, and operating conditions of electric machine, such as motor 120 at FIG. 1. Engine operating conditions may include engine speed and load, engine temperature, throttle position, air mass flow, engine airflow rate, CAC conditions (inlet and outlet temperature, inlet and outlet pressure, etc.), ambient temperature and humidity, MAP, pedal position, and boost level. Electric machine operating conditions may include motor rotation speed, direction of motor rotation, and state of charge (SOC) of an electric energy storage device, such as energy storage device 150, coupled to the motor.

Next, at 406, method 400 includes determining a level of condensate in the CAC, based on the engine operating conditions. In one example, the level of condensate may be based on output from a humidity sensor located within the CAC. In one example, a rate of condensate formation within the CAC may be based on ambient temperature, CAC outlet temperature, air mass flow, EGR, and humidity. This may then be used to calculate the amount or level of condensate in the CAC. In another example, a condensation formation value may be mapped to CAC outlet temperature and a ratio of CAC pressure to ambient pressure.

Upon determining the level of condensate, method 400 proceeds to 408. At 408, method 400 includes determining if the condensate level is above a threshold level. If it is confirmed that the condensate level is greater than the threshold, method 400 proceeds to 412. Otherwise, method 400 proceeds to 410. At 410, method 400 includes maintaining current vehicle operation.

At 412, upon confirming that that the condensate level is greater than the threshold, method 400 includes determining if CAC reverse purge conditions are met. CAC reverse purge conditions may include a battery state of charge (SOC) greater than a threshold level. The threshold level of charge may be based on the level of condensate, for example. Further, when the vehicle is ON, the CAC reverse purge conditions may include a gearshift lever position in park position. In other words, during vehicle ON conditions, CAC reverse purge conditions may be met if each of the following conditions is satisfied: the battery state of charge greater than the threshold, and gearshift lever in park position. In some examples, CAC reverse purge operation may be initiated when the vehicle is stopped and the engine is not used to propel the vehicle (e.g., at a traffic light or a stop sign). Accordingly, in some examples, when the vehicle is ON, CAC reverse purge conditions may include an engine OFF condition, the battery state of charge greater than the threshold level, and an accelerator pedal input less than a threshold input.

Thus, if it is confirmed that the vehicle is ON and the condensate level is greater than the threshold, the controller may proceed to confirm if battery state of charge is greater than the threshold and if the gear lever position is in park position or the vehicle is stopped to confirm reverse purge conditions. If the CAC reverse purge conditions are met at 412, method 400 proceeds to 413. At 413, method 400 includes performing a reverse purge operation to purge condensate from the CAC towards the intake air filter. Performing reverse purge operation includes reverse rotating the engine to flow air from the intake manifold towards the intake air filter via the CAC. By performing the reverse operation, condensate may be delivered from the CAC to the atmosphere without traversing the engine cylinders, thereby reducing the deposition of the condensate within the engine. As a result, cylinder misfires may be reduced. Details of performing the reverse purge operation will be further elaborated with respect to FIG. 6.

However if the CAC reverse purge conditions are not met, method 400 proceeds to 414. At 414, method 400 includes determining if conditions for performing a CAC forward purge conditions to purge the condensate from the CAC towards the engine are met. CAC forward purge conditions may include an exhaust catalyst temperature above a threshold temperature. When the exhaust catalyst temperature is greater than threshold, performing a CAC forward purge operation may reduce the deposition of the condensate within the exhaust catalyst as high exhaust catalyst temperatures may facilitate vaporization of the condensate. Therefore, in order to reduce condensate deposition within the exhaust catalyst, CAC forward purge operation where the condensate is delivered from the CAC towards the exhaust catalyst via the engine cylinders may not be performed when the exhaust catalyst temperature is below the threshold. Further, CAC forward purge conditions may include, for example, operating requirements for stable combustion conditions. Operating requirements for stable combustion may include engine coolant temperature being above a threshold, spark retard being within a threshold, VCT not being retarded greater than a threshold, EGR level being below a threshold, and fuel quality within a pre-determined level, for example. If these conditions are not met, a forward CAC purging operation may not be performed as combustion stability may be affected. In response to the conditions not being met, the routine proceeds to 416 where several steps may be performed to reduce a rate of condensation formation and to improve combustion stability.

As one example, at 419, the engine controller may take measures to reduce condensate formation at the CAC, such as by adjusting CAC efficiency. CAC efficiency may be adjusted (e.g., decreased) using a grille shutter system or a cooling fan. For example, the opening of the grill shutters may be decreased to decrease the external cooling airflow through the CAC and decrease the CAC efficiency.

In another example, at 420, the controller may adjust one or more engine operating parameters or actuators to improve or increase engine combustion stability. For example, an amount of spark retard applied may be reduced or limited during condensate ingestion. Upon improving the combustion stability, the routine of FIG. 4 may be restarted so that a CAC clean-out routine can be performed while combustion stability is within a threshold.

In yet another example, at 422, the controller may wait until the CAC forward purge conditions (as previously elaborated at 414) or reverse purge conditions (as previously elaborated at 412) are satisfied.

The controller may select one of the alternate options (419-422) depicted at 416 based at least on the amount of condensate within the CAC. For example, if a larger amount (e.g., more than a threshold amount) of condensate has built up within the CAC or the rate of condensate formation is higher (e.g., more than a threshold rate), a clean-out procedure may need to be performed sooner. In this case, the system may choose to adjust engine operating conditions, rather than delaying initiation of the purging operation until the conditions are satisfied on their own. In some examples, the routine may employ several of the options 419-422. For example, at 416, the controller may perform one or more alternate measures to reduce condensate formation (such as via grill shutter adjustments that reduce the CAC efficiency and thereby reduce condensate formation at the CAC); along with adjusting engine operating conditions to increase combustion stability.

Returning to 414, if the engine conditions for enabling a CAC forward purge operation are met, method 400 proceeds to 418. At 418, method 400 includes performing a CAC forward purge operation to purge condensate from the CAC towards the engine. During the forward purge operation, the engine is operated in a forward direction (opposite to reverse rotation). In one example, performing a CAC forward purge operation may include increasing airflow to the engine greater than requested by the vehicle operator without increasing the desired engine torque. For example, during engine operation, an intake throttle may be increased to increase airflow while one or more engine actuators may be adjusted to maintain desired torque. In some examples, a wastegate may be adjusted (to a more closed position) in order to increase boost to increase airflow through the CAC while adjusting one or more engine actuators to maintain desired torque.

In another example, CAC forward purge operation may be performed during a deceleration event to purge CAC. For example, airflow to the engine via the CAC may be increased, by increasing an intake throttle opening, for example, to purge condensate during a deceleration event. Further, in order to maintain the desired deceleration, wheel braking may be increased. Still further, the vehicle may be operated in a torque-absorbing mode while the airflow is increased during deceleration.

Figure 5:
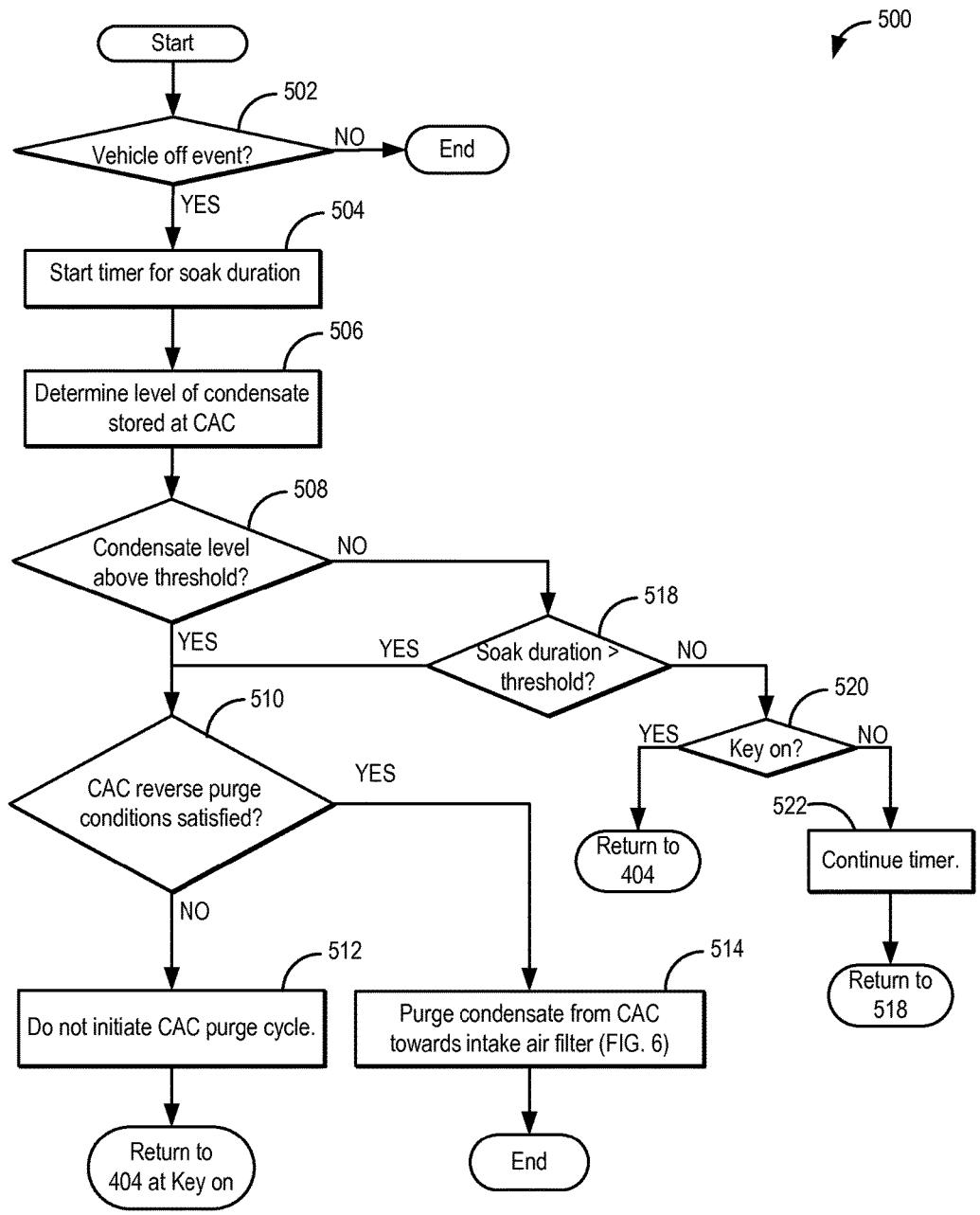
FIG. 5 shows a flow chart illustrating an example method for initiating a purging operation to purge condensate from a CAC during vehicle OFF conditions.

Turning to FIG. 5, a method 500 for initiating a purging operation to purge condensate from the CAC during vehicle OFF conditions is shown. Specifically, method 500 includes determining if a reverse purging operation may be performed to purge condensate from the CAC towards the intake air filter. Method 500 may be performed in coordination with method 400 discussed at FIG. 4.

Method 500 begins at 502. At 502, method 500 includes confirming a vehicle OFF event. A vehicle OFF event may be confirmed in response to a key OFF condition where the vehicle includes an active key, a stop button actuated condition where the vehicle includes an ignition start/stop button, and a passive key being outside a threshold distance of the vehicle where the vehicle includes a passive key. In response to the vehicle OFF event, at 504, the controller may start a timer to monitor a duration of time elapsed after the vehicle is turned OFF.

Next method 500 proceeds to 506. At 506, method 500 includes determining a level of condensate stored at the CAC. The level of condensate may be determined based on output from a humidity sensor located within the CAC, for example. In some examples, when a humidity sensor is not available for determining the level of condensate within the CAC, the amount of condensate may be estimated based on one or more of a time of last purge (forward or reverse) operation, duration of engine operation since last purge (forward or reverse) operation, an estimation of the condensate during the latest engine operation (vehicle ON), duration spent in the vehicle off condition, and ambient humidity. Upon determining and/or estimating the level of condensate within the CAC, method 500 proceeds to 508.

At 508, method 500 includes confirming if the level of condensate is greater than a threshold. If the answer at 508 is YES, method 500 proceeds to 510. Otherwise, the level of condensate is not greater than the threshold, and accordingly, method 500 proceeds to 516. Upon confirming that the level of condensate is greater than the threshold, at 510 method 500 includes determining if conditions for performing a CAC reverse purge operation to purge condensate within the CAC towards the engine air filter are satisfied. The conditions for reverse purge operation during vehicle OFF conditions include a battery state of charge greater than a threshold.

If it is confirmed that the reverse purge conditions are satisfied, method 500 proceeds to 514. At 514, method 500 includes purging the condensate from the CAC towards the intake air filter. During reverse purge operation a motor may be rotated backwards to spin the engine un-fueled in the reverse direction. Further, the intake and the exhaust valves may be operating during the reverse rotation of the engine. However, the functions of the intake and the exhaust valves may be reversed during the reverse rotation. For example, the intake valves function as exhaust valves and the exhaust valves function as intake valves when the engine is rotating in reverse. Thus, during reverse purge, air may be taken in via the exhaust manifold and the exhaust valves, and compressed air from the engine cylinders may be delivered to the intake manifold via the intake valves. The pressurized air from the intake manifold may then be delivered to the atmosphere via the CAC. As the pressurized air travels through the CAC, condensate from the CAC is purged towards the intake air filter, thus reducing the deposition of condensate within the engine and exhaust components. Details of performing the reverse purge operation will be further elaborated with respect to FIG. 6.

However, if the reverse purge conditions are not satisfied, method 500 proceeds to 512. At 512, method 500 may include not initiating the reverse CAC cycle. For example, if it is determined that the battery SOC is less than the threshold, then sufficient battery power may not be available to motor the engine backwards. Therefore, reverse CAC purge may not be initiated. The vehicle controller may then wait until either forward or reverse purge conditions are satisfied to purge the CAC. For example, if reverse CAC purge conditions are not satisfied, the vehicle controller may determine at next key ON if reverse purge conditions are satisfied. As discussed previously, reverse purge conditions during key ON may include vehicle in a parked position (that is, gear in parked position), and battery SOC greater than a threshold. If reverse purge conditions are satisfied at the next key ON event, the vehicle controller may initiate the reverse purge operation. However, if the reverse purge conditions are not satisfied at the next key-on, the vehicle controller may proceed to method 400 to determine if a forward CAC purging operation may be performed as discussed above with respect to method 400 described at FIG. 4.

Returning to 508, responsive to the key-off event, if it is determined that the condensate level is not greater than the threshold, method 500 proceeds to 518. At 518, method 500 includes determining if a soak duration (that is, duration for which the vehicle has been turned off) is greater than a threshold duration. Condensate may accumulate in the CAC after a long soak duration (e.g., overnight soak). Therefore, a reverse purge operation may be performed when the soak duration increases above the threshold while the vehicle remains turned off in order to reduce the amount of condensate in the CAC. Accordingly, upon confirming that the soak duration is greater than the threshold duration, method 500 proceeds to 510 to confirm if reverse purge conditions are satisfied. As discussed above, reverse purge conditions may include a battery SOC greater than a threshold. If reverse purge conditions are satisfied, method 500 may include initiating a CAC reverse purge operation during the vehicle OFF condition. Initiating a CAC reverse purge operation may include utilizing the battery to operate the motor and utilizing the motor to operate the engine un-fueled in reverse. In other words, the engine is operated in reverse via the motor operating in reverse. When the engine is operating in reverse, the functions of the intake and the exhaust systems are interchanged. That is, air is taken in via the exhaust pipe and exhaust valves into the cylinders, compressed by the cylinders, and the compressed air is delivered to the intake via the intake valves. When sufficient intake manifold pressure is built, intake throttle may be opened to release the compressed air to the atmosphere. As the compressed air travels from the intake manifold towards the atmosphere via the CAC, the condensate accumulated within the CAC is pushed towards the atmosphere by the compressed air. In this way, the reverse purge operation may purge condensate from the CAC towards the atmosphere. Details of performing a reverse purge operation will be further elaborated with respect to FIG. 6. By performing a reverse purge operation, condensate is purged towards the air filter and thus, the condensate does not travel through the cylinder and exhaust parts, thereby accumulation of the condensate within the engine system may be reduced. Consequently, when the engine is operating, misfires due to condensate being inhaled into the cylinders (during a heavy tip-in, for example) may be reduced.

The reverse purge operation during the vehicle OFF condition may be continued until the condensate reaches below the threshold, or until one or more reverse purge termination conditions are met. The reverse purge termination conditions may include the SOC below the threshold, a key ON event resulting in a change in gear lever position from park mode to a drive mode, and accelerator pedal input greater than threshold.

In one example, if the reverse purge during vehicle OFF condition is terminated responsive to one or more reverse purge termination conditions being met while the condensate level is greater than the threshold, the controller may set a flag to execute method 400 at next key ON.

In another example, when the reverse purge operation is performed during vehicle-off conditions, in response to a key ON event, the reverse purge operation may be continued until one of the following conditions including the gear lever position change from park mode, battery SOC below the threshold, and condensate level below the threshold are met.

Returning to 518, if it is determined that the soak duration is not greater than the threshold, method 500 proceeds to 520. At 520, method 500 includes determining if a key ON event has occurred. Upon confirming a key ON event, method 500 returns to 404 of method 400 to monitor condensate level during vehicle ON conditions and purge condensate if the condensate level is greater than a threshold. If a key ON event is not confirmed, method 500 proceeds to 522 where the method includes continuing the timer for soak duration. The method then returns to 518 and proceeds from 518 as discussed above.

Turning to FIG. 6, an example method 600 for performing a reverse purge operation to purge condensate from a CAC is shown. Method 600 may be performed in coordination with methods 400 and 500 described at FIGS. 5 and 6 respectively. Specifically, method 600 may be performed in response to reverse CAC purge conditions being satisfied during vehicle ON or vehicle OFF conditions. As discussed above, in one example, the CAC reverse purge operation may be performed during a vehicle OFF condition responsive to a key OFF event, condensate level within the CAC greater than the threshold, and a battery state of charge greater than a threshold. In another example, the CAC reverse purge operation may be performed when the vehicle is ON and responsive to a key ON event, condensate level greater than threshold, gear lever in park position, and a battery state of charge greater than threshold. In yet another example, the CAC reverse purge operation may be performed during vehicle ON conditions when the vehicle is stopped (e.g., when the vehicle is stopped at a stop sign or a traffic light) and the engine is not utilized to propel the vehicle. In still another example, during a vehicle OFF reverse purge operation, responsive to a vehicle ON event and the condensate level remaining greater than the threshold, the reverse purge operation may continue during the transition from the vehicle OFF condition to the vehicle ON condition and during the vehicle ON condition, if reverse purge operation conditions are satisfied.

Further, in some examples, the reverse purge operation may be performed at regular intervals. The set interval may be a duration of engine operation or a distance of vehicle travel, for example. As an example, after a threshold vehicle distance has elapsed since last CAC purge cycle, at a next key OFF event, the reverse purge operation may be performed if the SOC is greater than the threshold.

In still another example, the reverse purge operation may be performed based on ambient humidity. For example, when a duration of engine operation during conditions when ambient humidity is high (greater than a threshold humidity) exceeds above a threshold, the reverse purge operation may be performed.

Method 600 begins at 602. At 602, method 600 includes determining if a manifold absolute pressure (MAP) is greater than a first threshold. MAP may be estimated based on output from a MAP sensor, such as MAP sensor 122 at FIGS. 2 and 3. For example, MAP may be greater than threshold if the vehicle has been operating with boost. Thus, if the MAP is greater than the first threshold, method 600 may proceed to 604. At 604, method 600 includes waiting for the boost to leak. That is, the controller may wait until the MAP has decreased below the first threshold to initiate the reverse purge operation. The method then returns.

If it is confirmed that the MAP is greater than the threshold, method 600 proceeds to 605 to initiate reverse purge operation. Initiating reverse purge operation includes, at 606, operating the motor by utilizing a driver circuit, such as driver circuit 700 shown at FIG. 7. Details of operating the motor will be further elaborate with respect to FIG. 7. Initiating reverse purge operation further includes, at 608, rotating the engine un-fueled and in reverse via the motor. For example, the motor may be utilized to spin the engine unfueled. Further, when the motor is utilized to reverse rotate the engine, the motor may be decoupled from the transmission, via a clutch, for example. As such, the engine coupling with the motor may be the same as coupling during forward rotation. Further, during rotation of the engine in reverse without fueling, the intake valves and the exhaust valves are operational (That is only fuel injection to the cylinders is stopped, and the intake and the exhaust valves are active). However, when the engine is motored in reverse, the operations of the exhaust valves, and the operations of the intake valves are reversed. Thus, during reverse rotation of the engine, air is taken in through the exhaust manifold and the exhaust valves into the engine cylinder. The engine cylinders then compress the air, and the compressed air may be delivered to the intake manifold via the intake valves.

Still further, initiating reverse purge operation includes, at 610, opening a compressor bypass valve (CBV), such as CBV 27 at FIG. 2. By opening the CBV, airflow from the intake manifold may bypass the compressor. This provides a shorter path for airflow from the intake manifold towards the atmosphere, thereby improving reverse purge efficiency while also reducing condensate accumulation within the compressor. Further, initiating reverse purge operation includes, at 612, opening a wastegate, such as wastegate 25 at FIG. 2; at 614, closing an EGR valve, such as EGR valve 142 at FIG. 2; and at 616, closing an intake throttle, such as intake throttle 23 at FIG. 3, and a canister purge valve (not shown). By closing the intake throttle and the purge valve, pressure is allowed to build within the intake manifold, thereby increasing the MAP.

Next, upon initiating the reverse purge operation, method 600 proceeds to 618. At 618, method 600 includes determining if MAP is greater than a second threshold. That is, it may be determined if sufficient pressure is available in the intake manifold for purging the CAC towards the intake air filter. The second threshold may be greater than the first threshold. Upon confirming that the MAP is greater than the second threshold, method 600 proceeds to 619. At 619, method 600 includes maintaining operating (motoring) the engine un-fueled in reverse. Simultaneously, method 600 includes, at 620, opening the intake throttle to deliver pressurized air from the intake manifold towards the intake air filter via the CAC. By delivering the pressurized air from the intake manifold to the intake air filter via the CAC, condensate accumulated within the CAC is purged away from the engine cylinders and towards the intake air filter. Further, while purging the condensate, the CBV and the wastegate may be maintained open, while the EGR valve and the canister purge valve may remain closed. Still further, during purging the CAC in reverse, air along with the purged condensate may be delivered from the CAC to the atmosphere via a conduit, such as conduit 206 at FIG. 2, that by passes the air filter. Thus, during the reverse purge operation, the pressurized air from the intake manifold flows to the atmosphere via the CAC, by passing the compressor and the air filter. An example path of the airflow from the intake manifold to the atmosphere via the CAC during the reverse purge operation is shown in FIG. 3.

In some examples, responsive to the MAP reaching the second threshold, a movement of the intake throttle may be adjusted to generate shock waves inside the CAC.

In one example, adjusting the movement of the intake throttle may include alternating a position of the intake throttle between a more open position and a less open position. That is, upon the MAP reaching the second threshold, the intake throttle may be adjusted to a more open position and then immediately adjusted again to a less open (or more closed) position. The adjustment of intake throttle position between the more open and the less open positions may be repeated for a desired duration or a desired number of times to generate turbulence in airflow across the CAC. By generating turbulence in the airflow through the CAC, shock waves may be generated, which may facilitate purging of the trapped condensate within the CAC. In some examples, the movement of the intake throttle opening may be alternately adjusted between a fully closed position and any open position (including fully open position) for the desired number of times or the desired duration. In some other examples, the movement of the intake throttle may be alternately adjusted between a fully open position and any position that is less than fully opened position for the desired number of times or the desired duration.

Further, in one example, the shock waves may be generated as long as the reverse purge operation is in progress. In some examples, the shock waves may be generated for a duration immediately after the MAP reaches the second threshold and prior to fully opening the intake throttle in order to increase a rate of CAC purging. In some other examples, the shock waves may be generated towards the end of the reverse purge operation (that is when a condensate amount decreases below a threshold) to facilitate purging of residual condensate that remains trapped within the CAC. Next, method 600 proceeds to 624. At 624, method 600 includes determining if CAC reverse purge termination conditions are met. Reverse purge termination conditions may include a battery state of charge less than threshold or a condensate level below the threshold. Thus, if the battery SOC decreases below the threshold or the condensate level in the CAC decreases below the threshold, the reverse purge operation may be terminated. Further, reverse purge termination conditions may include a key ON condition with a change in gear lever position from the park mode to drive mode if the reverse purge operation is being performed during vehicle-on conditions and an accelerator pedal input greater than the threshold. However, if the reverse purge operation is being performed during vehicle off conditions, in addition to battery charge below a threshold or a condensate level below a threshold, reverse purge operation may be terminated if the vehicle operation changes from a vehicle OFF condition to a vehicle ON condition (that is, responsive to key ON). In some examples, if the key is turned ON while the condensate level is above threshold, sufficient battery charge is available (that is, battery SOC is above threshold), and the gear lever is in the park position, the reverse purge operation may not be terminated at key ON and may be continued until any of the reverse purge termination conditions are satisfied.

If the reverse purge termination conditions are met, method 600 proceeds to 628 to terminate the reverse purge operation. Terminating the reverse purge operation may include, adjusting operation of motor to stop spinning the engine in reverse. Further, terminating the reverse purge operation may include adjusting an intake throttle position, a wastegate position, a CBV position, and a purge valve position based on engine operating conditions.

In some examples, when the reverse purge operation is terminated, if the condensate remains above the threshold, a forward purge operation may be performed upon the forward purge conditions being met. As an example, a vehicle may be turned ON after a long soak duration and the gearshift lever may be in a park mode. At key ON, the condensate may be greater than the threshold and the SOC may be greater than the threshold. Thus, at key ON, reverse purge conditions are satisfied and the reverse purge operation may be performed. However, a vehicle operator may change the gearshift lever away from the park mode to drive mode prior to the condensate level decreasing to the threshold, and the accelerator pedal input may be greater than a threshold input. Consequently, the reverse purge operation may be terminated. However, since the condensate remains greater than the threshold, the vehicle controller may determine if forward purge conditions are satisfied (e.g., vehicle in engine mode and exhaust catalyst temperature greater than threshold). If yes, forward purge operation may be performed. Otherwise, the vehicle controller may wait until forward purge conditions are satisfied to initiate the forward purge operation. However, prior to the forward purge conditions are satisfied, if vehicle ON reverse purge conditions are satisfied (e.g., if vehicle is stopped at a traffic light and SOC is greater than threshold), reverse purge operation may be performed again. Further, in some other examples, if it is predicted that reverse purge conditions may be satisfied during the current drive cycle (for example, based on navigation history, current location, etc.), and the condensate level (or rate of condensate accumulation) is within a higher threshold indicating that probability of misfire due to condensate ingestion is low or if the vehicle is expected to operate in a motor mode for a threshold duration, even if forward purge conditions are satisfied, the vehicle controller may wait until reverse purge conditions are satisfied to initiate a CAC purge operation. That is, priority may be given to a reverse purge operation over a forward purge operation.

However, if condensate levels are greater than the higher threshold, in order to reduce misfires due to condensate ingestion during engine operation, a condensate purge operation (forward or reverse based on whether the forward or reverse conditions are satisfied first) may be performed to reduce the condensate levels in the CAC.

Returning to 624, if the reverse purge conditions are not met at 624, method 600 proceeds to 626 to continue the reverse purging operation until at least one of the reverse purge termination conditions are met.

In this way, a reverse purge operation may be performed to reduce condensate accumulation within the CAC.

Turning to FIG. 7, an example driver circuit 700 for operating a DC motor is shown. Specifically, driver circuit 700 may be utilized to rotate a DC motor 720 in a forward direction or a reverse direction. DC motor 720 may be an example of a motor, such as motor 120 at FIG. 1 included within a vehicle propulsion system. In one example, the driver circuit may be integrated within a control unit of the vehicle. In another example, the driver unit may be coupled to the control unit via one or more connectors. In the given example, driver circuit 700 is configured as an H-bridge circuit.

Driver circuit 700 includes transistors 704, 706, 708 and 710, and resistors 705. Transistors 704 and 706 connect motor 720 to a voltage source Vcc, while transistors 708 and 710 connect motor 720 to the ground. Voltage source Vcc may be an energy storage device, such as energy storage device 150 at FIG. 1. Transistors 704 and 706 may be configured as PNP transistors, and transistors 708 and 710 may be configured as NPN transistors. While the given example illustrates an H-bridge implemented with bipolar NPN and PNP transistors, it will be appreciated that the H-bridge may be implemented with FET, MOFETs or power MOSFETs.

Motor 720 may be rotated in a first direction by energizing transistors 706 and 708 while maintaining transistors 704 and 710 in an OFF state. Transistor 706 may be energized when voltage at node B is low, and transistor 708 may be energized when voltage at node A is high. Thus, in order to energize transistors 706 and 708, high voltage input is applied at A and low voltage input is applied at B. By energizing transistors 706 and 708, current flows from transistor 706 to 708 via motor 720, which causes the motor to turn in the first direction. In one example, the motor may be operated in the first direction to start a forward rotation of an engine, such as engine 10 at FIG. 1, during an engine start-up when motor torque may be used to start the engine.

Motor 720 may be rotated in a second direction, opposite to the first direction, by energizing transistors 704 and 710 while maintaining transistors 706 and 708 in an OFF state. Transistor 704 may be energized when voltage at node A is low, and transistor 710 may be energized when voltage at node B is high. Thus, in order to energize transistors 704 and 710, low voltage input is applied at A and high voltage input is applied at B. When transistors 704 and 710 are energized, current flows from transistor 704 to transistor 710 (current flow shown by current flow path 716) via motor 720. This causes the motor to rotate in the second direction. Voltage input at nodes A and B may be accomplished via one or more switches (not shown), for example. In this way, by changing a path of current flow through the driver circuit, direction of rotation of the motor may be changed.

In one example, during a reverse CAC purge operation, by energizing transistors 704 and 710, the motor may be rotated in the second direction to reverse rotate the engine.

FIG. 8 shows an example map 800 illustrating example CAC purge operations based on vehicle operating conditions. Specifically, FIG. 8 illustrates example forward and reverse CAC purge operations, and an example switching between forward and reverse CAC purge operations, according to the present disclosure.

The sequence of FIG. 8 may be provided by executing instructions in the system of FIG. 1 according to the method of FIG. 4 in cooperation with the method of FIGS. 5 and 6. Vertical markers at times t0-t12 represent times of interest during the sequence.

Specifically, the first plot from the top of FIG. 8 depicts engine speed versus time, and the speed increases in the direction of the Y-axis arrow. Trace 802 depicts change in engine speed.

The second plot from the top of FIG. 8 depicts a direction of engine rotation versus time. Trace 804 depicts forward or reverse direction of engine rotation.

The third plot from the top of FIG. 8 depicts operation of electric motor versus time. Trace 806 depicts ON or OFF operation of the motor.

The fourth plot from the top of FIG. 8 depicts a direction of motor rotation versus time. Trace 808 depicts forward or reverse direction of motor rotation.

The fifth plot from the top of FIG. 8 depicts condensate level in the CAC versus time, and the condensate level increases in the direction of Y-axis arrow. Trace 810 depicts change in condensate level, and line 812 depicts threshold condensate level.

The sixth plot from the top of FIG. 8 depicts a CAC purging mode versus time. Trace 814 depicts forward purge mode, reverse purge mode or no purge mode of the CAC.

The seventh plot from the top of FIG. 8 depicts exhaust catalyst temperature versus time, and the exhaust catalyst temperature increases in the direction of Y-axis arrow. Trace 816 depicts change in exhaust catalyst temperature, and line 818 depicts threshold temperature.

The eighth plot from the top of FIG. 8 depicts operation of vehicle versus time. Trace 820 depicts ON or OFF operation of the vehicle.

The ninth plot from the top of FIG. 8 depicts position of shift lever. Trace 822 depicts drive position or park position of the shift lever.

At t0 and between t0 and t1, the vehicle may be turned ON and the engine may be operating in an engine mode with engine rotating in the forward direction (804) and motor OFF (806). The engine may be rotated in the forward direction using fuel injection for vehicle propulsion. During forward engine rotation with fuel injection, fresh intake air enters an intake passage and flows through an air filter positioned in the intake passage before flowing to the intake manifold. Intake air is then provided to the engine cylinders, where the intake air and fuel are combusted; and the exhaust gas generated due to combustion is routed from the engine cylinders to the atmosphere via the exhaust manifold and exhaust passage. Further, at t0 and between t0 and t1, the condensate level in the CAC may be below the threshold. Just prior to t1, the condensate level may increase above the threshold (812). Therefore, at t1, responsive to the condensate level increasing above the threshold, it may be desirable to initiate a purge operation to purge condensate from the CAC. However, at t1, the exhaust catalyst temperature may be below the threshold. Since the exhaust catalyst temperature is below the threshold, initiating a forward purge operation (where the CAC condensate is purged from the CAC towards the engine cylinders and exhaust catalyst) may cause the condensate to deposit within the exhaust catalyst, as the exhaust catalyst temperature may not be sufficient to vaporize the condensate. Therefore, at t1, a forward purge operation may not be initiated even though the condensate level is greater than the threshold. Further, a reverse purge operation may not be initiated as the vehicle is operating in the engine mode. That is, as the engine is used to propel the vehicle (forward engine spin), the engine may not be used simultaneously to purge the CAC towards the intake air filter (which requires reverse engine spin). Taken together, at t1, a CAC purge operation (forward or reverse) may not be initiated. Further, at t1, in some examples, the engine controller may set a flag to monitor condensate level at next key OFF and initiate reverse purge during the next key OFF if the condensate level is greater than the threshold and if reverse purge conditions are met.

Between t1 and t2, the vehicle may continue to operate in the engine mode and the condensate may continue to accumulate within the CAC (810). As discussed above, due to engine mode of vehicle operation, and exhaust catalyst temperature below the threshold, a CAC purge operation (forward or reverse) may not be initiated.

Next, at t2, the vehicle operation may switch to motor mode, where the motor is used to propel the vehicle. Consequently, the engine spins to rest (802). Further, at t2 and between t2 and t3, a gear lever position may be in a drive mode (not shown) and the accelerator pedal input may be greater than a threshold (not shown). Thus, conditions for reverse CAC purge operation (gear lever position in park mode or vehicle stopped with accelerator pedal input less than threshold when vehicle is ON) may not be satisfied. Therefore, reverse CAC purge operation may not be initiated. Further, at t2 and between t2 and t3, the exhaust catalyst temperature may continue to remain below the threshold. Therefore, a forward purge operation may not be initiated. Thus, during times t2 and between t2 and t3, a CAC purge operation (forward or reverse) may not be performed. In some examples, between t1 and t3, when the condensate level is above the threshold and a CAC purge operation is not performed, several steps may be performed to reduce a rate of condensation formation and to improve combustion stability as discussed at 416 of method 400 shown at FIG. 4. These may include reducing CAC efficiency and reducing an amount of spark retard until a next CAC purge operation (forward or reverse) is initiated.

At t3, the vehicle may be turned OFF (that is, a key OFF event may occur). At key-off, the condensate level may be greater than the threshold. Further, a battery SOC may be greater than threshold. Thus, at t3, conditions for a vehicle OFF reverse CAC purge operation (key OFF, condensate level greater than threshold, and SOC greater than threshold) are satisfied. Further, due to the vehicle operating in motor mode prior to the key OFF event, a MAP may be less than a first threshold (not shown). Therefore, at t3, a reverse CAC purge operation may be performed. As discussed above, with respect to FIG. 6, performing a reverse CAC purge operation includes operating the motor by utilizing the battery and utilizing the motor to spin the engine un-fueled in reverse. In this way, engine may be motored to spin in reverse. As a result, air is delivered the cylinders via the exhaust manifold and the exhaust valves. The air is then compressed by the cylinders and the compressed air is delivered to the intake manifold via the intake valves. During an initial phase of the reverse purge operation the intake throttle may be closed (not shown) in order to increase the MAP above a second threshold. Responsive to the MAP reaching the second threshold, in the intake throttle may be opened and pressurized air may be flown from the intake manifold towards the atmosphere via the CAC by passing the compressor (CBV open), and via a filter bypass passage (to bypass the intake air filter) and a check valve in the filter bypass passage. In this way, by flowing pressurized air from the intake manifold to the atmosphere via the CAC, condensate accumulating within the CAC may be purged towards the atmosphere without traversing the engine cylinders and the exhaust components. Further, by bypassing the compressor and the intake air filter, condensate accumulation within the compressor and the intake air filter may be reduced.

In some examples, responsive to the MAP reaching the second threshold, the intake throttle may be moved to generate turbulent airflow within the CAC. For example, moving the intake throttle may include alternately adjusting positions of the intake throttle between a first position and a second, different, position. For example, the first position may be any open position; and the second position may be position that is more open or more closed than the first position. In some examples, the first position may be a fully open position. In some other examples, the first position may be a fully closed position. When the first position is the fully closed position, the second position may be any open position, including fully open position. The adjustment of the intake throttle may be performed for a number of times or a desired duration to generate turbulent airflow. The turbulent airflow may generate shock waves inside the CAC, which may further assist in dislodging the condensate within the CAC. A frequency of oscillation of the shock waves may be at least based on an amount of opening of the intake throttle, and the number of the times the intake throttle is opened and closed. The reverse purge operation may be continued between t3 and t4. As the reverse purge operation progresses, condensate within the CAC decreases (810). At t4, the vehicle is turned ON. However, at t4, the condensate may continue to remain above the threshold. Further, at t4, the vehicle may be operating with the gearshift lever in the park position. Therefore, responsive to the vehicle ON event and the condensate level above the threshold, the reverse purge operation may be continued during the transition from the vehicle OFF condition to the vehicle ON condition. Further, the reverse purge operation may be continued until the condensate decreases below the threshold as long as the battery SOC is above the threshold and the gearshift lever is in the park position. That is, the motor may continue to spin in the reverse direction and the reverse motor operation may be utilized to spin the engine in the reverse direction for the reverse purge operation. In this example, between t4 and t6, the battery SOC may remain above the threshold and the gearshift lever may remain in the park position. Accordingly, the reverse purge operation may continue at t4 and between t4 and t5. It must be noted that if the battery SOC decreases below the threshold or the gearshift lever is moved out of park position, while the condensate remains above the threshold, a forward purge operation may be performed when forward purge conditions (e.g., exhaust catalyst temperature above the threshold) are met. However, during the vehicle operation, if forward purge conditions are not met and the condensate remains above the threshold, appropriate actions may be taken to reduce chances of misfire and reduce the rate of condensate accumulation. The actions that may be taken to reduce chances of misfire and reduce rate of condensate formation may include switching to motor mode of vehicle operation (if SOC is above a threshold), adjusting spark timing and reducing an efficiency of the CAC to reduce condensate accumulation.

At t5, the condensate level may decrease below threshold. Responsive to the condensate level decreasing below the threshold, the reverse purge operation may be terminated at t5. Terminating the reverse purge operation may include stopping reverse rotation of the engine by stopping reverse rotation of the motor. For example, the controller may provide high voltage input to both nodes of a drive circuit (such as nodes A and B at FIG. 7) to stop rotation of the motor. Alternatively, the controller may provide low voltage input to both the nodes to stop the rotation of the motor.

At t6, a vehicle OFF event may occur and the vehicle may continue to remain in the OFF condition between t6 and t7. Further, at t6, a timer may be started responsive to the vehicle OFF event to monitor the duration (herein referred to as soak duration) for which the vehicle remains in the OFF state. For example, condensate can accumulate within the CAC after an overnight soak when water vapors liquefy to form the condensate. Accordingly, if the soak duration exceeds a threshold, the controller may initiate a reverse purge operation while the vehicle remains in the OFF condition to reduce condensate levels. However, between t6 and t7, the soak duration may remain within the threshold. Accordingly, a reverse purge operation may not be initiated. Next, at t7, another vehicle ON event may be detected (based on a key ON event, for example) and the condensate may be below the threshold level. Responsive to the vehicle ON event, the vehicle may be operated in the motor mode until time t8 and then the vehicle operation may switch to the engine mode at t8 and continue operating in the engine mode between t8 and t9. Further, between t7 and t9 (including times t7 and t9), the condensate level may remain below the threshold. At t9, the exhaust catalyst temperature may increase above the threshold. However, since the condensate level is below the threshold, a CAC purge operation may not be performed.

At time just before t10, the condensate level may reach the threshold and at t10, the condensate level may be above the threshold. Further, at t10, the exhaust catalyst temperature may be above the threshold and the vehicle may be operating in the engine mode (that is, engine operating with fuel injection). Therefore, at t10, responsive to the condensate level above the threshold and the exhaust catalyst temperature above the threshold, a forward CAC purge operation may be performed. Performing a forward CAC purge operation may include increasing airflow to the CAC to purge the condensate towards the engine. Details of performing the forward purge operation are discussed with respect to FIG. 4.

At times between t10 and t11, condensate level may decrease as the CAC is purged. However, the condensate level may continue to remain above the threshold. At t11, a vehicle OFF event is detected. Therefore, as the engine spins down to rest, the forward purge operation is terminated. However, at t11, the condensate level remains above the threshold. Therefore, at t11, responsive to the key OFF and the condensate level remaining above the threshold, a reverse CAC purge operation may be performed. It must be noted that at t11, the battery SOC may be above a threshold, therefore, the battery may be utilized to spin the motor in the reverse direction, which is in turn used to spin the engine in the reverse direction. As discussed above, the engine is motored un-fueled and in the reverse direction to increase MAP. The pressurized air from the intake manifold is then used to purge the condensate from the CAC towards the atmosphere. However, if the battery SOC is below the threshold, even though the condensate is above the threshold and the vehicle is turned off, the reverse purge operation may not be initiated. During such conditions, a forward purge operation may be performed (provided forward purge conditions are met (e.g., exhaust catalyst temperature above threshold)) during next vehicle operation (vehicle ON condition).

At times between t11 and t12, reverse purge operation may be continued. At t12, the condensate level may decrease below the threshold, responsive to which the reverse CAC purge operation may be terminated.

In this way, based on vehicle and engine operating conditions, a forward or a reverse CAC purge operation may be performed to reduce condensate accumulation within the CAC.

In one example, method for a boosted engine, includes responsive to a condensate level within a charge air cooler increasing above a threshold level, reverse rotating the engine unfueled and flowing pressurized air from an intake manifold of the engine towards an intake air filter via the charge air cooler. In a first example of the method, the flowing pressurized air includes initially increasing an intake manifold pressure by reverse rotating the engine unfueled with an intake throttle closed, and responsive to the intake manifold pressure reaching the threshold pressure, opening the intake throttle while reverse rotating the engine unfueled. A second example of the method optionally includes the first example and further includes wherein the engine is reverse rotated via a motor electrically coupled to a battery when a state of charge of the battery is above a threshold amount. A third example of the method optionally includes one or more of the first and second examples, and further includes wherein reverse rotating the engine is responsive to the condensate level above the threshold and responsive to a key OFF event when the state of charge of the battery is above the threshold amount during the key OFF event. A fourth example of the method optionally includes one or more of the first through third examples, and further includes, wherein reverse rotating the engine is responsive to the condensate level above the threshold and responsive to a key ON event when the state of charge of the battery is above the threshold amount during the key ON event and when a gearshift lever in a park position. A fifth example of the method optionally includes one or more of the first through fourth examples, and further includes, wherein reverse rotating the engine is responsive to the condensate level above the threshold level during a vehicle ON condition when the state of charge of the battery is above the threshold amount and the vehicle is stopped. A sixth example of the method optionally includes one or more of the first through fifth examples, and further includes, opening a compressor bypass valve, opening a wastegate, and closing an EGR valve during the flowing. A seventh example of the method optionally includes one or more of the first through sixth examples, and further includes, wherein the reverse rotation of the engine and the flowing are terminated responsive to one or more of the condensate level decreasing to the threshold level and the state of charge decreasing below the threshold amount; and wherein the threshold amount of state of charge is based on the condensate level.

In another example, a method for a boosted engine includes responsive to a condensate level within a charge air cooler increasing above a threshold, during a first condition, purging condensate from the charge air cooler towards an exhaust catalyst via engine cylinders; and during a second condition, purging condensate from the charge air cooler towards an intake air filter. In a first example of the method, purging the condensate from the charge air cooler towards the exhaust catalyst includes rotating the engine in a forward direction and increasing airflow to the engine greater than requested by a vehicle operator, the increasing airflow including increasing an opening of an intake throttle valve; and wherein purging condensate from the charge air cooler towards the intake air filter comprises rotating the engine unfueled in a reverse direction via a motor, and responsive to an intake manifold pressure increasing above a threshold pressure, fully opening the intake valve and flowing compressed air from the engine cylinders towards the intake air filter via the charge air cooler. A second example of the method optionally includes the first example and further includes wherein purging condensate from the charge air cooler towards the intake air filter comprises rotating the engine unfueled in a reverse direction via a motor, and responsive to an intake manifold pressure increasing above a threshold pressure, alternating the intake valve between a first position and a second position for a threshold number of times, and delivering turbulent compressed airflow from the engine cylinders towards the intake air filter via the charge air cooler. A third example of the method optionally includes one or more of the first and second examples, and further includes wherein the first condition includes a vehicle ON condition and an exhaust catalyst temperature greater than a threshold; and wherein the second condition includes a vehicle OFF condition and a state of charge of a battery electrically coupled to the motor above a threshold. A fourth example of the method optionally includes one or more of the first through third examples, and further includes, responsive to the condensate level above the threshold, during a third condition including the vehicle ON condition and the exhaust catalyst temperature below the threshold, not purging condensate from the charge air cooler and adjusting engine operation to increase combustion stability. A fifth example of the method optionally includes one or more of the first through fourth examples, and further includes, wherein during purging condensate from the charge air cooler towards the intake air filter, the condensate from the charge air cooler is flown to the atmosphere via a compressor bypass passage coupled across a compressor and a passage communicating with an intake passage at a location upstream of the compressor and downstream of the intake air filter at one end and the atmosphere at the other end; the passage including a check valve.

In another example, a hybrid vehicle system includes an engine including an intake manifold, the intake manifold communicating with the ambient via an intake passage; a compressor coupled to the intake passage upstream of an intake throttle; a charge air cooler coupled downstream of the compressor; a conduit coupled to the intake passage at a location upstream of the compressor and downstream of an intake air filter; a check valve located within the conduit; and a controller with computer readable instructions stored on non-transitory memory for: during a first condition, increasing air flow through a charge air cooler in a first direction; during a second condition, increasing air flow through the charge air cooler in a second opposite direction; and during a third condition, changing the direction of airflow through the charge air cooler from the first direction to the second direction. In a first example of the system, the first condition includes a condensate level above the threshold, a vehicle ON condition, an accelerator pedal input greater than a threshold input, and an exhaust catalyst temperature above a threshold temperature. A second example of the system optionally includes the first example and further includes wherein the second condition includes the condensate level above the threshold, a vehicle OFF condition, and a battery state of charge above a threshold. A third example of the system optionally includes one or more of the first and second examples, and further includes, wherein the second condition includes the condensate level above the threshold, a vehicle ON condition, a battery state of charge above a threshold, and a gearshift lever in a park position. A fourth example of the system optionally includes one or more of the first through third examples, and further includes, wherein the third condition includes a key OFF event while the air flow through the charge air cooler increased in the first direction prior to the key OFF event, the condensate level above the threshold during the key OFF event and the battery state of charge above the threshold during the key OFF event. A fifth example of the method optionally includes one or more of the first through fourth examples, and further includes, wherein increasing air flow during the first condition is performed by increasing an opening of an intake throttle and spinning the engine in a forward direction with fuel injection; wherein increasing air flow during the second condition is performed by spinning the engine in a reverse direction without fuel injection via a motor, the motor operated by a battery; and wherein changing the direction of air flow through the CAC is performed by changing a direction of rotation of the engine from the forward direction to the reverse direction.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
responsive to a condensate level within a charge air cooler increasing above a threshold level, reverse rotating the engine unfueled and flowing pressurized air from an intake manifold of the engine towards an intake air filter via the charge air cooler.

2. The method of claim 1, wherein the flowing pressurized air includes initially increasing an intake manifold pressure by reverse rotating the engine unfueled with an intake throttle closed, and responsive to the intake manifold pressure reaching a threshold pressure, opening the intake throttle while reverse rotating the engine unfueled.

3. The method of claim 1, wherein the engine is reverse rotated via a motor electrically coupled to a battery when a state of charge of the battery is above a threshold amount.

4. The method of claim 3, wherein reverse rotating the engine is responsive to the condensate level above the threshold level and responsive to a key OFF event when the state of charge of the battery is above the threshold amount during the key OFF event.

5. The method of claim 3, wherein reverse rotating the engine is responsive to the condensate level above the threshold level and responsive to a key ON event when the state of charge of the battery is above the threshold amount during the key ON event and when a gearshift lever is in a park position.

6. The method of claim 3, wherein reverse rotating the engine is responsive to the condensate level above the threshold level during a vehicle ON condition when the state of charge of the battery is above the threshold amount and a vehicle is stopped.

7. The method of claim 3, further comprising: opening a compressor bypass valve, opening a wastegate, and closing an EGR valve during the flowing.

8. The method of claim 3, wherein the reverse rotation of the engine and the flowing are terminated responsive to one or more of the condensate level decreasing to the threshold level and the state of charge decreasing below the threshold amount; and wherein the threshold amount of the state of charge is based on the condensate level.

9. A method for a boosted engine, comprising:
responsive to a condensate level within a charge air cooler increasing above a threshold,
during a first condition, purging condensate from the charge air cooler towards an exhaust catalyst via engine cylinders; and
during a second condition, purging condensate from the charge air cooler towards an intake air filter.

10. The method of claim 9, wherein purging the condensate from the charge air cooler towards the exhaust catalyst includes rotating the engine in a forward direction and increasing airflow to the engine greater than requested by a vehicle operator, the increasing airflow including increasing an opening of an intake throttle valve; and wherein purging condensate from the charge air cooler towards the intake air filter comprises rotating the engine unfueled in a reverse direction via a motor, and responsive to an intake manifold pressure increasing above a threshold pressure, fully opening the intake throttle valve and flowing compressed air from the engine cylinders towards the intake air filter via the charge air cooler.

11. The method of claim 10, wherein during purging condensate from the charge air cooler towards the intake air filter, the condensate from the charge air cooler is flown to the atmosphere via a compressor bypass passage coupled across a compressor and a passage communicating with an intake passage at a location upstream of the compressor and downstream of the intake air filter at one end and the atmosphere at the other end; the passage including a check valve.

12. The method of claim 9, wherein the first condition includes a vehicle ON condition and an exhaust catalyst temperature greater than a threshold; and wherein the second condition includes a vehicle OFF condition and a state of charge of a battery electrically coupled to a motor above a threshold.

13. The method of claim 12, further comprising:
responsive to the condensate level above the threshold, during a third condition including the vehicle ON condition and the exhaust catalyst temperature below the threshold, not purging condensate from the charge air cooler and adjusting engine operation to increase combustion stability.

14. The method of claim 9, wherein purging condensate from the charge air cooler towards the intake air filter comprises rotating the engine unfueled in a reverse direction via a motor, and responsive to an intake manifold pressure increasing above a threshold pressure, alternating an intake valve between a first position and a second position for a threshold number of times, and delivering turbulent compressed airflow from the engine cylinders towards the intake air filter via the charge air cooler.

15. A hybrid vehicle system, comprising:
an engine including an intake manifold, the intake manifold communicating with ambient air via an intake passage;
a compressor coupled to the intake passage upstream of an intake throttle;
a charge air cooler coupled downstream of the compressor;
a conduit coupled to the intake passage at a location upstream of the compressor and downstream of an intake air filter;
a check valve located within the conduit; and
a controller with computer readable instructions stored on non-transitory memory for:
during a first condition, increasing air flow through the charge air cooler in a first direction;
during a second condition, increasing air flow through the charge air cooler in a second opposite direction; and
during a third condition, changing the direction of airflow through the charge air cooler from the first direction to the second direction;
wherein the first condition includes a condensate level above a threshold, a vehicle ON condition, an accelerator pedal input greater than a threshold input, and an exhaust catalyst temperature above a threshold temperature.

16. The system of claim 15, wherein increasing air flow during the first condition is performed by increasing an opening of the intake throttle and spinning the engine in a forward direction with fuel injection; wherein increasing air flow during the second condition is performed by spinning the engine in a reverse direction without fuel injection via a motor, the motor operated by a battery; and wherein changing the direction of air flow through the charge air cooler is performed by changing a direction of rotation of the engine from the forward direction to the reverse direction.

17. The system of claim 15, wherein the second condition includes the condensate level above the threshold, a vehicle OFF condition, and a battery state of charge above a threshold.

18. The system of claim 15, wherein the second condition includes the condensate level above the threshold, a vehicle ON condition, a battery state of charge above a threshold, and a gearshift lever in a park position.

19. The system of claim 15, wherein the third condition includes a key OFF event while the air flow through the charge air cooler increased in the first direction prior to the key OFF event, the condensate level above the threshold during the key OFF event and a battery state of charge above a threshold during the key OFF event.

* * * * *